*US008325697B2*

United States Patent
Wu et al.

(10) Patent No.: US 8,325,697 B2
(45) Date of Patent: Dec. 4, 2012

(54) METHODS AND APPARATUS FOR SELECTING AND TRANSMITTING PILOTS

(75) Inventors: Xinzhou Wu, Monmouth Junction, NJ (US); Junyi Li, Chester, NJ (US); Cyril Measson, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 12/578,245

(22) Filed: Oct. 13, 2009

(65) Prior Publication Data

US 2011/0085453 A1 Apr. 14, 2011

(51) Int. Cl.
*H04W 4/00* (2009.01)
(52) U.S. Cl. .................... 370/341; 370/252; 375/260
(58) Field of Classification Search .......... 370/203–208, 370/216–228, 241–252, 328, 329, 338, 341; 375/260–265
See application file for complete search history.

(56) References Cited

U.S. PATENT DOCUMENTS

| 7,327,812 | B2* | 2/2008 | Auer | 375/347 |
|---|---|---|---|---|
| 2001/0004377 | A1 | 6/2001 | Lee et al. | |
| 2006/0198455 | A1* | 9/2006 | Fujii et al. | 375/260 |
| 2006/0233125 | A1* | 10/2006 | Pajukoski et al. | 370/320 |
| 2007/0002759 | A1* | 1/2007 | Diaz et al. | 370/252 |
| 2008/0151938 | A1 | 6/2008 | Yang et al. | |
| 2008/0268887 | A1* | 10/2008 | Jansen et al. | 455/503 |
| 2008/0298497 | A1 | 12/2008 | Cho et al. | |
| 2009/0135720 | A1* | 5/2009 | Li et al. | 370/232 |
| 2009/0271550 | A1* | 10/2009 | Clausen et al. | 710/269 |
| 2010/0254339 | A1 | 10/2010 | Ihm et al. | |
| 2011/0085620 | A1 | 4/2011 | Measson et al. | |
| 2011/0158164 | A1 | 6/2011 | Palanki et al. | |
| 2011/0189949 | A1* | 8/2011 | Fox et al. | 455/15 |

(Continued)

FOREIGN PATENT DOCUMENTS

GB 2407951 A 5/2005

(Continued)

OTHER PUBLICATIONS

Dan Raphaeli, "Noncoherent Coded Modulation", IEEE Transactions on Communications, vol. 44, No. 2 Feb. 1, 1996, pp. 172-183, XP002636140, Retrieved from the Internet : URL: http://ieeexplore.ieee.org/stamp/stamp.jsp?tp=&arnumber=486610 [retrieved on May 21, 2011.

(Continued)

*Primary Examiner* — Ricky Ngo
*Assistant Examiner* — Kan Yuen
(74) *Attorney, Agent, or Firm* — James O'Hare; Paul S. Holdaway

(57) ABSTRACT

Sets of communications resources, e.g., sets of peer discovery resources, in a peer to peer communications system are used concurrently by multiple transmitting devices. The communications system supports a plurality of different pilot sequences. Multiple transmitting devices may transmit their signals on the same set of communications resources, but with different pilot sequences. This approach allows receiving devices to distinguish between multiple signal sources, e.g., wireless terminals, using a shared communications resource. A wireless communications device monitors a plurality of different sets of communications resources and selects, e.g., based on received energy levels, a set of communications resources from said plurality of different sets of communications resources to use for communication. The communications device further selects one of a plurality of different pilot sequences to use for said communication and transmits pilot signals using the selected pilot sequence and at least a portion of the selected set of communications resources.

17 Claims, 22 Drawing Sheets

U.S. PATENT DOCUMENTS

2012/0014280 A1    1/2012    Li et al.

FOREIGN PATENT DOCUMENTS

| | | |
|---|---|---|
| GB | 2425024 A | 10/2006 |
| WO | WO9619879 | 6/1996 |
| WO | WO0045518 | 8/2000 |
| WO | WO0209306 | 1/2002 |
| WO | WO2004039022 | 5/2004 |
| WO | WO2005086729 A2 | 9/2005 |
| WO | WO2007054406 A1 | 5/2007 |
| WO | WO2008082280 A1 | 7/2008 |
| WO | WO2009009542 A2 | 1/2009 |

OTHER PUBLICATIONS

International Search Report and Written Opinion—PCT/US2010/052346, ISA/EPO—May 18, 2011.

\* cited by examiner

METHODS AND APPARATUS FOR SELECTING AND TRANSMITTING PILOTS

FIELD

Various embodiments relate to wireless communications, and more particularly, to methods and apparatus for communicating information in a system where air link resources may be, and sometimes are, reused.

BACKGROUND

In ad-hoc wireless networks, e.g., peer to peer wireless communications systems, there may be a large number of wireless communications devices in a local vicinity at any given time. It would be beneficial if a peer to peer wireless device could communicate small amounts of information, e.g., discovery information, relatively frequently to other devices which may happen to be in its vicinity. It should be expected that the other devices, e.g., intended recipients, may not be maintaining ongoing channel estimates with one another.

Due to the number of anticipated devices that may be concurrently operating in a local vicinity and the limited amount of air link resources available to support signaling, e.g., peer discovery signaling, it may be desirable for multiple transmitting devices to concurrently use the same set of communications resources. Based on the above discussion, it should be appreciated there is a need for methods and apparatus facilitating concurrent use of a set of communications resources by multiple transmitting devices.

SUMMARY

Methods and apparatus of communicating information in a wireless communications system using shared resources are described. Various described methods and apparatus are well suited for use in ad-hoc networks, e.g., peer to peer wireless communications systems, in which resource utilization decisions for at least some types of air link resources are made in a decentralized manner, e.g., by individual transmitting devices. In some ad-hoc peer to peer networks wireless terminals directly communicate with one another without the involvement of a central network controller. Various features are particularly advantageous to embodiments in which a large number of users may be competing for a limited number of sets of communications resources, and the sets of resources may be, and sometimes are, anticipated to be used concurrently by multiple transmitting devices in the network.

In one exemplary embodiment, the sets of communications resources are sets of peer discovery resources in a wireless peer to peer communications system. In some but not all embodiments, a set of peer discovery communications resources is a set of OFDM tone-symbols corresponding to a single OFDM tone for a predetermined number of consecutive OFDM symbol transmission time periods. In some embodiments sets of peer discovery resources occur during peer discovery intervals as part of a recurring peer to peer timing structure.

In some embodiments, a wireless device may transmit, e.g., broadcast, a relatively small amount of peer discovery information relatively frequently. The peer discovery information is intended to be available to be received and recovered by other peer to peer wireless devices which may be in its local vicinity. An intended recipient device may or may not have an ongoing channel estimate with respect to the transmitting device. Embedded pilot signals, communicated in a portion of a peer discovery resource set used to communicate discovery information, are used to facilitate peer discovery information recovery.

The exemplary peer to peer communications system supports a plurality of different alternative pilot sequences. Multiple transmitting devices may transmit their peer discovery signals on the same set of peer discovery resources, but may use different pilot sequences. This allows a receiving device to distinguish between signals from different devices. In various embodiments, the sets of different pilot sequences are orthogonal. In some embodiments, the sets of different pilot sequences are Walsh sequences. In some embodiments, the sets of different pilot sequences are Fourier sequences. The use of different pilot sequences, corresponding to different transmitting devices, over a common air link resource, facilitates the recovery and separation of received information by a receiving device from multiple transmitting sources.

A wireless communications device, which intends to transmit peer discovery signals, makes two levels of selection, e.g., a selection of a set of peer discovery communications resources and a selection of a pilot sequence to use. The wireless communications device transmits signals including pilot signals, in accordance with its selected pilot sequence, and data signals using its selected set of peer discovery communications resources.

An exemplary method of operating a communications device to communicate information, in accordance with some embodiments, comprises: monitoring a plurality of different sets of communications resources; determining the amount of energy received on at least a first portion of said different sets of communications resources; and selecting a set of communications resources from said plurality of different sets of communications resources to use for communication. The exemplary method further comprises: selecting one of a plurality of different pilot sequences to use for said communication; and transmitting pilot signals using the selected one of the plurality of different pilot sequences and at least a second portion of the selected set of communications resources.

An exemplary communications device, in accordance with some embodiments, comprises: at least one processor configured to: monitor a plurality of different sets of communications resources; determine the amount of energy received on at least a first portion of said different sets of communications resources; select a set of communications resources from said plurality of different sets of communications resources to use for communication; select one of a plurality of different pilot sequences to use for said communication; and transmit pilot signals using the selected one of the plurality of different pilot sequences and at least a second portion of the selected set of communications resources. The exemplary communications device further includes memory coupled to said at least one processor. The exemplary communications device is, e.g., a wireless terminal, e.g., a mobile device such as a handheld phone device, handheld personal data assistant (PDA), etc.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
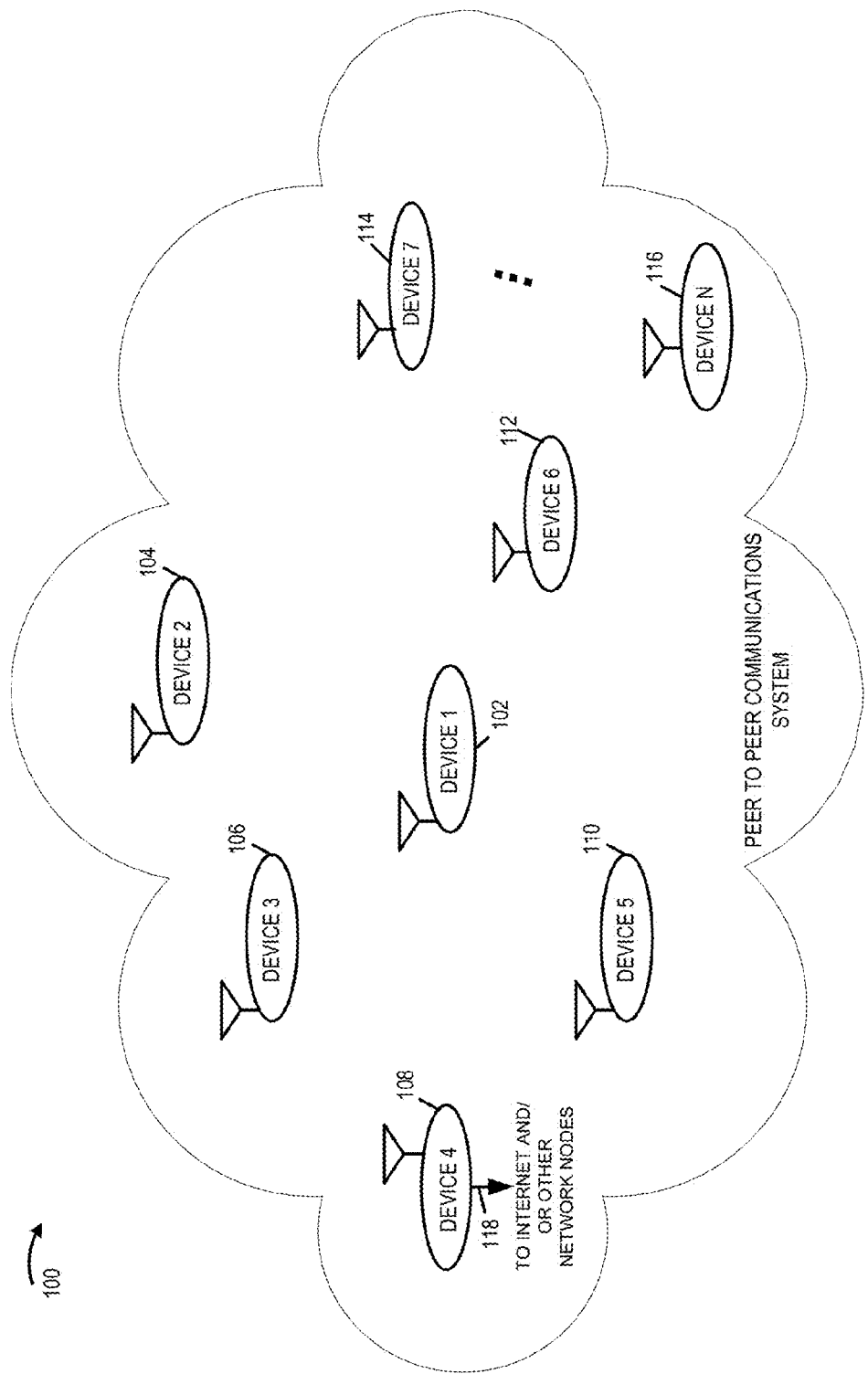
FIG. 1 is a drawing of an exemplary peer to peer communications system in accordance with an exemplary embodiment.

FIG. 1 is a drawing of an exemplary peer to peer communications system 100 in accordance with an exemplary embodiment. Exemplary peer to peer communications system 100 includes a plurality of wireless communications devices (device 1 102, device 2 104, device 3 106, device 4 108, device 5 110, device 6 112, device 7 114, . . . , device N 116. Some of the wireless communications devices, e.g., device 1 102, device 2 104, device 3 106, device 5 110, device 6 112, device 7 114, and device N 116, are mobile wireless communications devices, e.g., handheld wireless terminals supporting peer to peer communications. Some of the wireless communications devices, e.g., device 4 108, include an interface 118, e.g., a wired or fiber optic interface, coupling the device to the Internet and/or other network nodes via a backhaul network. Device 4 108 is, e.g., an access point supporting peer to peer communications. Peer to peer communications system 100 uses a recurring peer to peer timing structure including sets of peer discovery resources. A wireless communications device, e.g., device 1 102, which desires to transmit, e.g., broadcast, peer discovery information, monitors different sets of peer discovery resources, selects a set of peer discovery resources to use to transmit its peer discovery information, selects a pilot sequence to use for its peer discovery signals, and generates and transmits peer discovery signals including pilots symbols and data symbols using the selected peer discovery resource set.

Figure 2:
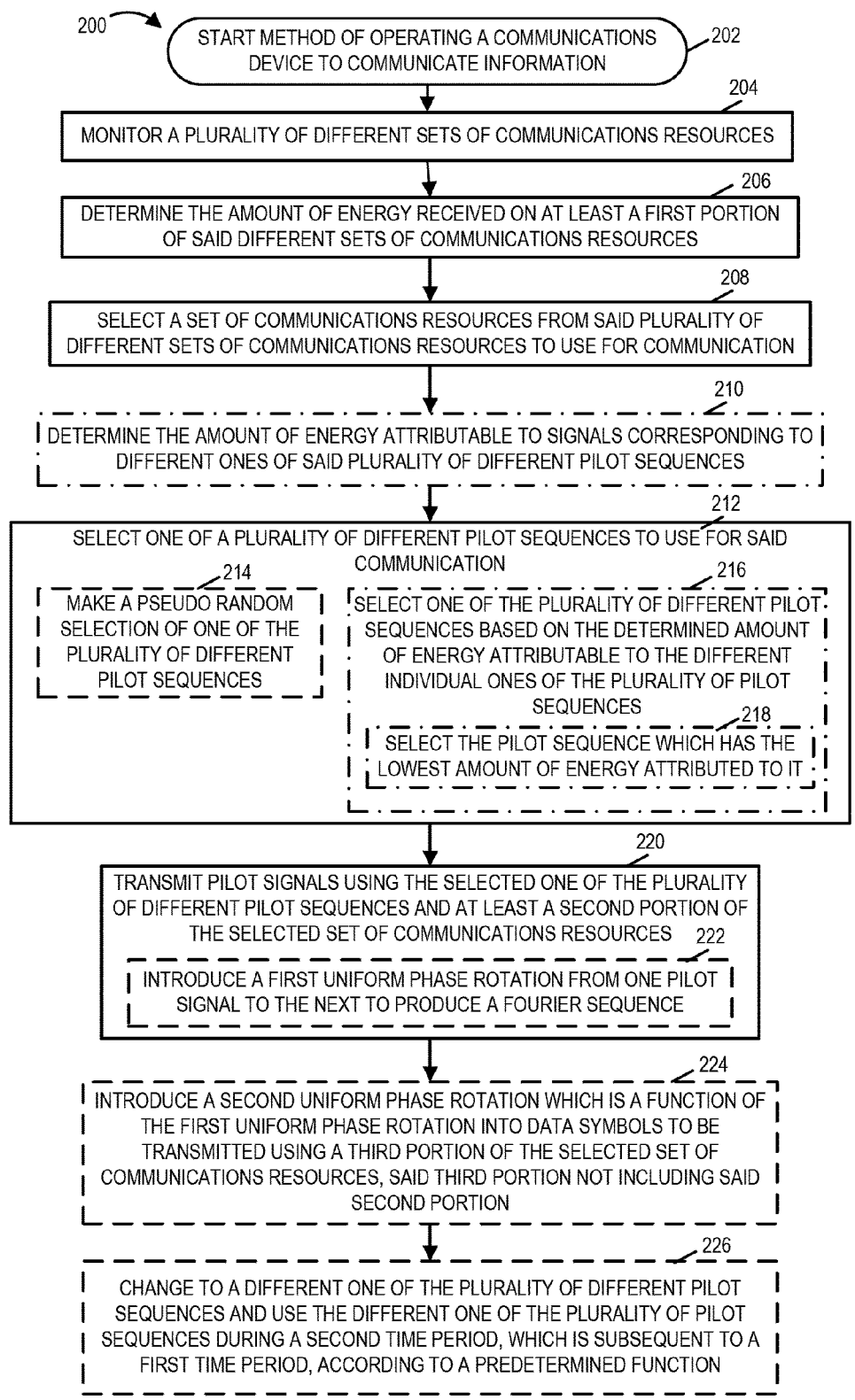
FIG. 2 is a flowchart of an exemplary method of operating a communications device to communicate information in accordance with an exemplary embodiment.

FIG. 2 is a flowchart 200 of an exemplary method of operating a communications device to communicate information. The communications device implements the method of flowchart 200 of FIG. 2 is, e.g., one of the devices (102, 104, 106, 108, 1110, 112, 114, . . . , 116) of system 100 of FIG. 1. In some embodiments, the communications device is a device in an ad hoc communications network, e.g., a peer to peer communications network. In various embodiments, the communications device is a mobile wireless terminal, e.g., a handheld communications device. Operation starts in step 202 where the communications device is powered on and initialized and proceeds to step 204.

In step 204 the communications device monitors a plurality of different sets of communications resources. In some embodiments, the different sets of communications resources are sets of peer discovery resources which recur in a predetermined timing structure used to control timing in a communications network in which the communications device, e.g., wireless communications device, is located. In various embodiments, an individual communications resource in a set of communications resources is a tone-symbol, e.g., an OFDM tone-symbol, and a signal transmitted on an individual communications resource is a modulation symbol. In some embodiments, each set of communications resources is a set of contiguous OFDM tone-symbols corresponding to a single tone for a predetermined number of symbol transmission time periods.

Operation proceeds from step 204 to step 206. In step 206 the communications device determines the amount of energy received on at least a first portion of said different sets of communications resources. In some embodiments, a first portion of a set of communications resources is the full set of individual communications resources in the set of communications resources. In some other embodiments, a first portion of a set of communications resources includes individual communications resources in the set associated with pilot symbols but does not include individual communications resources in the set associated with data symbols. Then in step 208 the communications device selects a set of communications resources from said plurality of different sets of communications resources to use for communication. In some embodiments, in step 208 the communications device selects a set of communications resources based on the determined amount of energy received on said at least a first portion of said different sets of communications resources, which was determined in step 206.

In some embodiments, optional step 210 is included and operation proceeds from step 208 to step 210. In other embodiments optional step 210 is not included and operation proceeds from step 208 to step 212.

Returning to step 210, in step 210 the communications device determines the amount of energy attributable to signals corresponding to different ones of said plurality of different pilot sequences. Operation proceeds from step 210 to step 212.

In step 212 the communications device selects one of a plurality of different pilot sequences to use for said communication. In some embodiments, the different pilot sequences in said plurality of different pilot sequences are orthogonal. In some such embodiments, the different pilot sequences are Fourier sequences. In some embodiments, the different pilot sequences in said plurality of different pilot sequences include pilots which differ in phase but not amplitude. In some embodiments the different pilot sequences are Walsh sequences. Other types of pilot sequences may be, and in some embodiments, are used, e.g., other pilot sequences based on a well-designed non-coherent code.

In some embodiments, step 212 includes one or more of step 214 and 216. In step 214 the communications devices makes a pseudo random selection of one of the plurality of different pilot sequences. In step 216 the communications device selects one of the plurality of different pilot sequences based on the determined amount energy attributable to the different ones of the plurality of pilot sequences. In some embodiments step 216 includes step 218 in which the communications device selects the pilot sequence which has the lowest amount of energy attributed to it. In some other cases the communications device selects the pilot sequence from among a predetermined number of pilots sequences having the lowest amounts of energy, e.g., the communications devices selects one of the two lowest power pilot sequences. In some other cases the communications device selects the pilot sequence from among any of the pilot sequences having an energy level below a threshold, e.g., the communications devices selects one of pilot sequences among any of the candidate pilot sequences which have energy levels below a predetermined threshold. Operation proceeds from step 212 to step 220.

In step 220 the communications device transmits pilot signals using the selected one of the plurality of different pilot sequences and at least a second portion, e.g., a pilot portion, of the selected set of communications resources. In some embodiments, step 220 include step 222 in which the communications device introduces a first uniform phase rotation from one pilot signal to the next to produce a Fourier sequence.

In various embodiments, the exemplary method includes one or more of steps 224 and 226. Operation proceeds from step 220 to step 224, in which the communications device introduces a second uniform phase rotation, which is a function of the first uniform phase rotation, into data symbols to be transmitted using a third portion of the selected set of communications resources, said third portion not including said second portion. Operation proceeds from step 224 to step 226. In step 226 the communications device changes to a different one of the plurality of pilot sequences during a second time period, which is subsequent to a first time period, according to a predetermined function. In some such embodiments, the selecting one of a plurality of different pilot sequences of step 212 was for the first time period. In various embodiments, the second time period is immediately subsequent the first time period. In some embodiments, the predetermined function used in step 226 is a hopping or pseudo random function.

Figure 3:
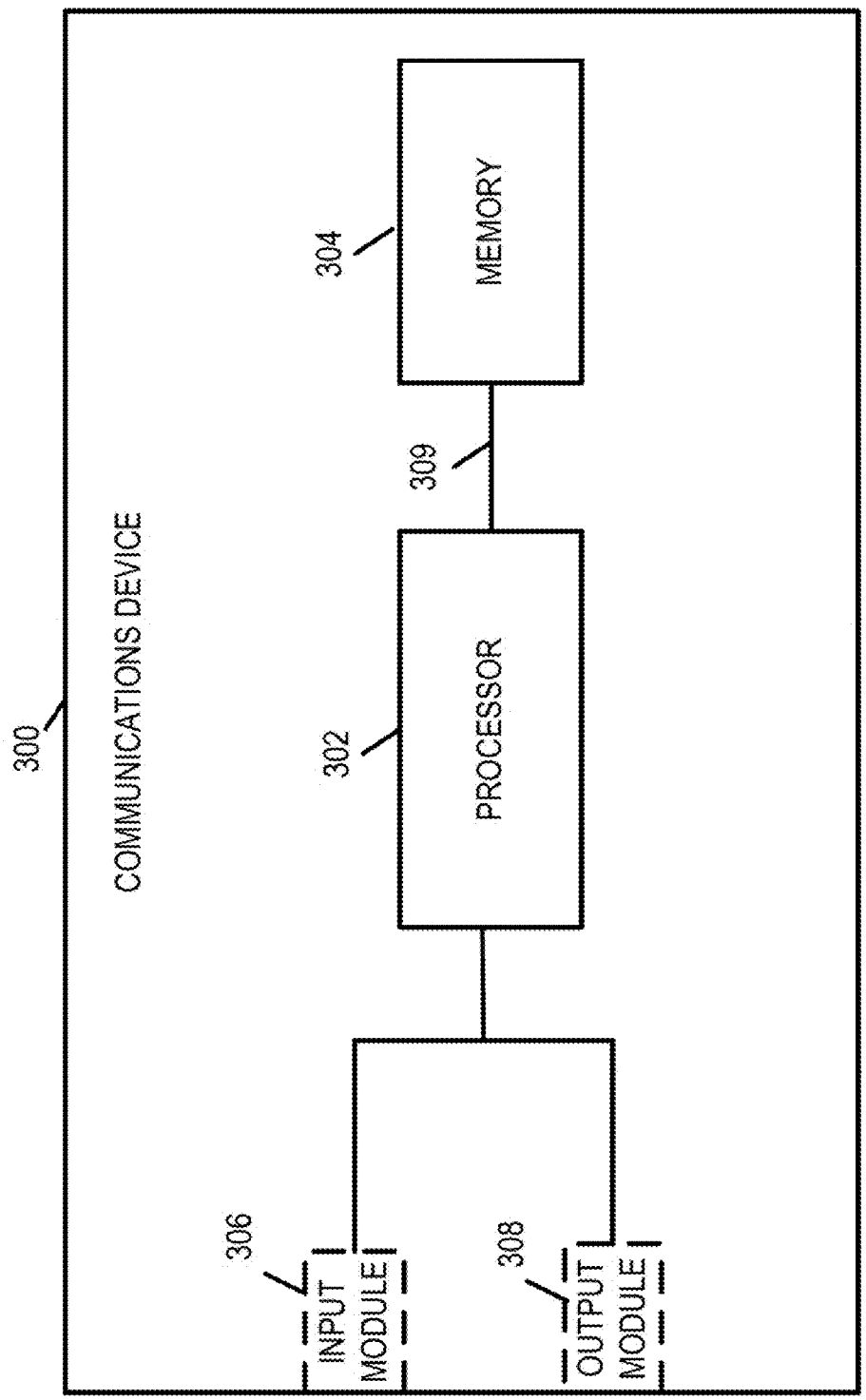
FIG. 3 is a drawing of an exemplary communications device, in accordance with an exemplary embodiment.

FIG. 3 is a drawing of an exemplary communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: monitor a plurality of different sets of communications resources; determine the amount of energy received on at least a first portion of said different sets of communications resources; and select a set of communications resources from said plurality of different sets of communications resources to use for communication. In some embodiments, the first portion of said different sets of communications resources includes each of the individual communications resources in said different sets of communications resources. In some other embodiments, the first portion of said different sets of communications resources includes only individual communications resources which are pilot communications resources. Processor 302 is further configured to: select one of a plurality of different pilot sequences to use for said communication; and transmit pilot signals using the selected one of the plurality of different pilot sequences and at least a second portion, e.g., a pilot portion, of the selected set of communications resources.

In some embodiments, processor 302 is configured to base said selection of a set of communications resources on the determined amount of energy received on said at least a first portion of said different sets of communications resources, as part of being configured to select a set of communications resources.

In various embodiments, the communications device 300 is a device in an ad hoc communications network. In some embodiments, the communications device 300 is a mobile wireless terminal, e.g., a handheld communications device. In some such embodiments, said ad hoc communications network is a peer to peer communications network.

In some embodiments, said different pilot sequences in said plurality of different pilot sequences are orthogonal. In some such embodiments, said different pilot sequences are Fourier sequences.

Processor 302, in some embodiments, is configured to introduce a first uniform phase rotation from one pilot signal to the next to produce said Fourier sequence, as part of being configured to transmit pilot signals; and processor 302 is further configured to introduce a second uniform phase rotation which is a function of the first uniform phase rotation into data symbols to be transmitted using a third portion of the selected set of communications resources, said third portion not including said second portion.

In some embodiments, said different pilot sequences are Walsh sequences. In various embodiments, said different pilot sequences in said plurality of different pilot sequences include pilots which differ in phase but not amplitude.

Processor 302, in some embodiments, is configured to make a pseudo random selection of one of the plurality of different pilot sequences, as part of being configured to select one of a plurality of different pilot sequences. In some such embodiments, processor 302 is configured to select one of a plurality of different pilot sequences was for a first time period as part of being configured to select one of a plurality of different pilot sequences; and processor 302 is further configured to change to a different one of the plurality of different pilot sequences and use the different one of the plurality of pilot sequences during a second time period which is subsequent to said first time period according to a predetermined function. In some embodiments, the second time period is an immediately subsequent time period of the same type with respect to the first time period. For example, the first time period corresponds to indexed peer discovery time period #1 and the second time period corresponds to indexed peer discovery time period #2 in a peer to peer recurring timing structure. In some embodiments, the predetermined function is one of a hopping or pseudo random function.

Processor 302, in some embodiments, is further configured to: determine the amount of energy attributable to signals corresponding to different ones of said plurality of different pilot sequences; and select one of the plurality of different pilot sequences based on the determined amount of energy attributable to the different individual ones of the plurality of pilot sequences. In some such embodiments, processor 302 is configured to select the pilot sequence which has the lowest amount of energy attributed to it, as part of being configured to select one of a plurality of different pilot sequences. In some other cases, processor 302 is configured to select one of a predetermined number of pilot sequences determined to have the lowest attributable energy, as part of being configured to select one of a plurality of different pilot sequences. For example, in one such embodiment, processor 302 is configured to select, e.g., pseudo randomly select, one of the two lowest received power pilot sequences, as part of being configured to select one of a plurality of different pilot sequences.

In some embodiments, said different sets of communications resources are sets of peer discovery resources which recur in a predetermined timing structure used to control timing in a communications network in which said wireless communications device is located. In various embodiments, an individual communications resource in said communications resources is a tone-symbol; and a signal transmitted on an individual communications resource is a modulation symbol. In some embodiments, each set of communication resources is a set of contiguous OFDM tone-symbols corresponding to a single tone for a predetermined number of symbol transmission time periods. For example, in one embodiment, a set of peer discovery communications resources corresponds to one tone for 16 consecutive OFDM symbol transmission time periods. In another embodiment, a set of peer discovery communications resources corresponds to one tone for 64 consecutive OFDM symbol transmission time periods.

Figure 4:
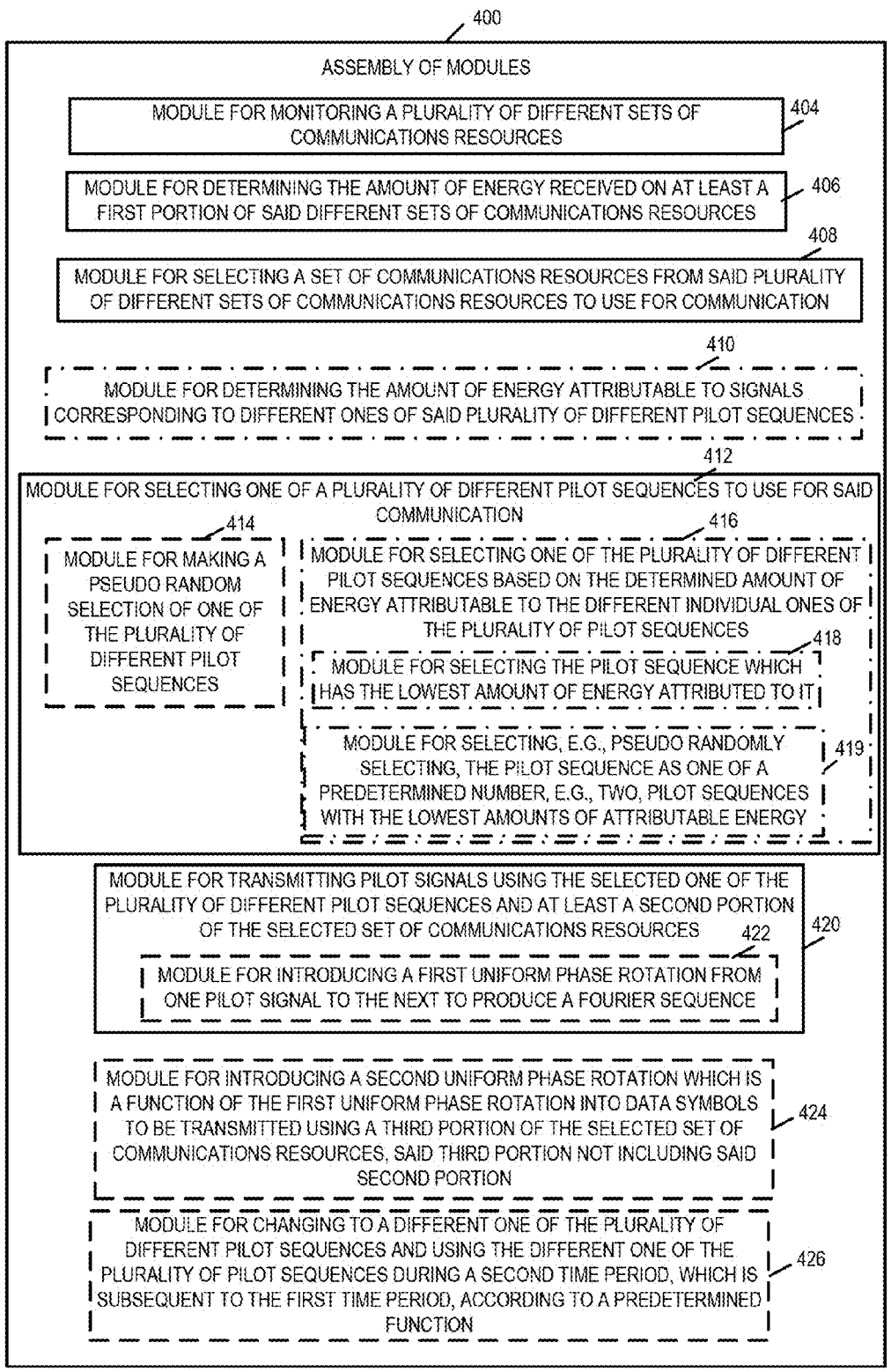
FIG. 4 is an assembly of modules which can, and in some embodiments is, used in the communications device illustrated in FIG. 3.

FIG. 4 is an assembly of modules 400 which can, and in some embodiments is, used in the communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

Assembly of modules 400 includes a module 404 for monitoring a plurality of different sets of communications resources, a module 406 for determining the amount of energy received on at least a first portion of said different sets of communications resources, and a module 408 for selecting a set of communications resources from said plurality of different sets of communications resources to use for communications. Assembly of modules 400 further includes a module 412 for selecting one of a plurality of different pilot sequences to use for said communication, and a module 420 for transmitting pilot signals using the selected one of the plurality of different pilot sequences and at least a second portion of the selected set of communications resources.

In some embodiments, assembly of modules 400 further includes a module 410 for determining the amount of energy attributable to signals corresponding to different ones of said plurality of different pilot sequences. In some embodiments module 412 includes one or more of a module 414 for making a pseudo random selection of one of the plurality of different pilot sequences and a module 416 for selecting one of the plurality of different pilot sequences based on the determined amount of energy attributable to the different individual ones of the plurality of pilot sequences. In some embodiments module 416 includes a module 418 for selecting the pilot sequence which has the lowest amount of energy attributed to it. In some embodiments, module 416 includes a module 419 for selecting the pilot sequence as one of a predetermined number of pilot sequences with the lowest amounts of determined attributable energy. For example, in some embodiments, module 419 pseudo-randomly selects the pilot sequence from among the two pilot sequences determined to have the lowest amounts of attributable energy.

In some embodiments, module 420 includes a module 422 for introducing a first uniform phase rotation from one pilot signal to the next to produce a Fourier sequence. In some such embodiments, assembly of modules 400 further includes a module 424 for introducing a second uniform phase rotation which a function of the first uniform phase rotation into data symbols to be transmitted using a third portion of the selected set of communications resources, said third portion of the selected set of communications resources not including said second portion.

In some embodiments, assembly of modules 400 further includes a module 426 for changing to a different one of the plurality of different pilot sequences and using the different one of the plurality of pilot sequences during a second time period, which is subsequent to a first time period during which the selected one of the plurality of different pilot sequences was used, according to a predetermined function.

Figure 5:
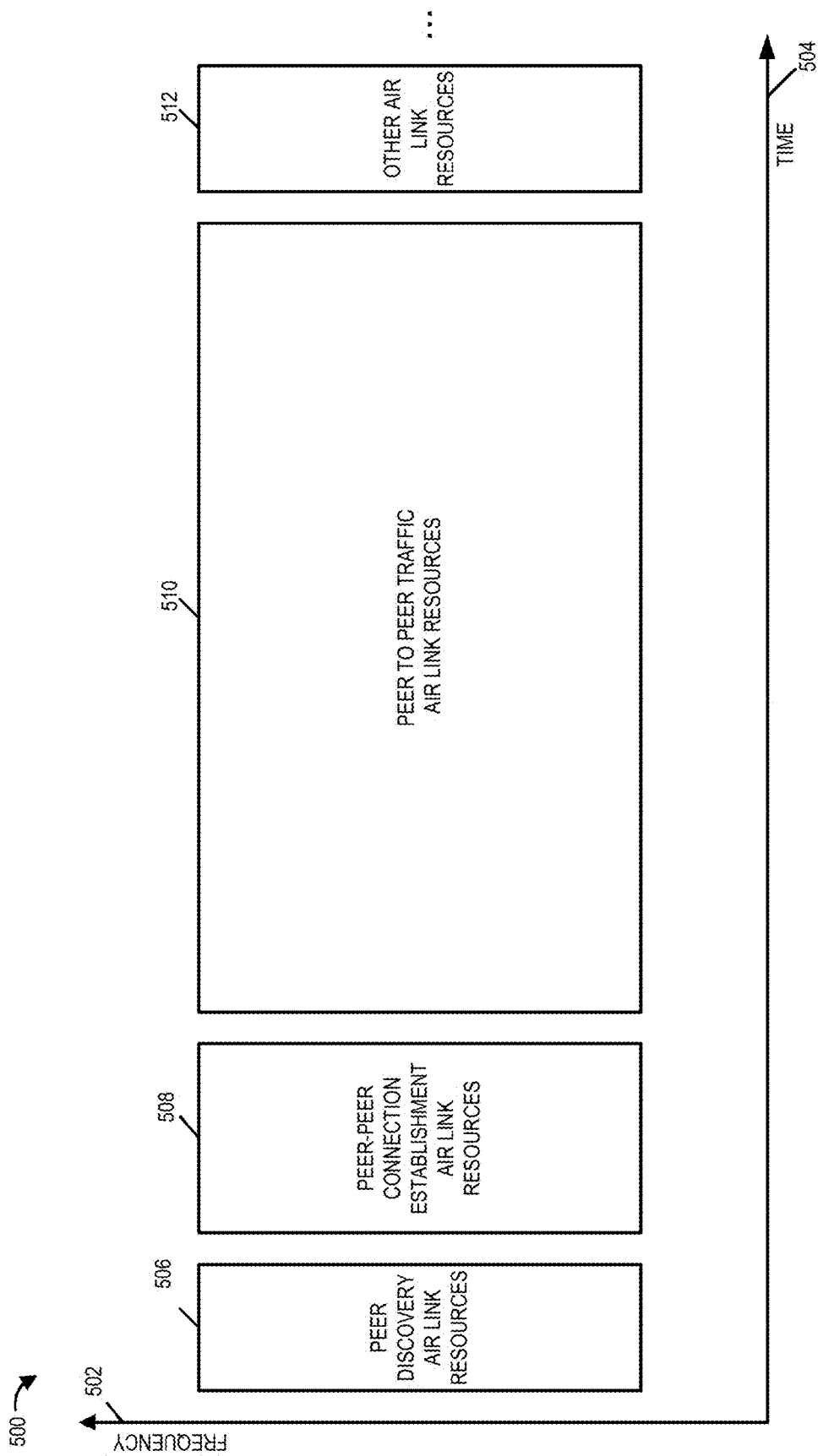
FIG. 5 is a drawing of an exemplary frequency vs time plot illustrating exemplary air link resources in an exemplary peer to peer recurring timing structure.

FIG. 5 is a drawing of an exemplary frequency vs time plot 500 illustrating exemplary air link resources in an exemplary peer to peer recurring timing structure. Frequency vs time plot 500 include a vertical axis 502 representing frequency, e.g., OFDM tones, and a horizontal axis 504 representing time, e.g., OFDM symbol transmission time intervals. Plot 500 includes peer discovery air link resource 506, peer to peer connection establishment air link resources 508, peer to peer traffic air link resources 510 and other air link resources 512.

Figure 6:
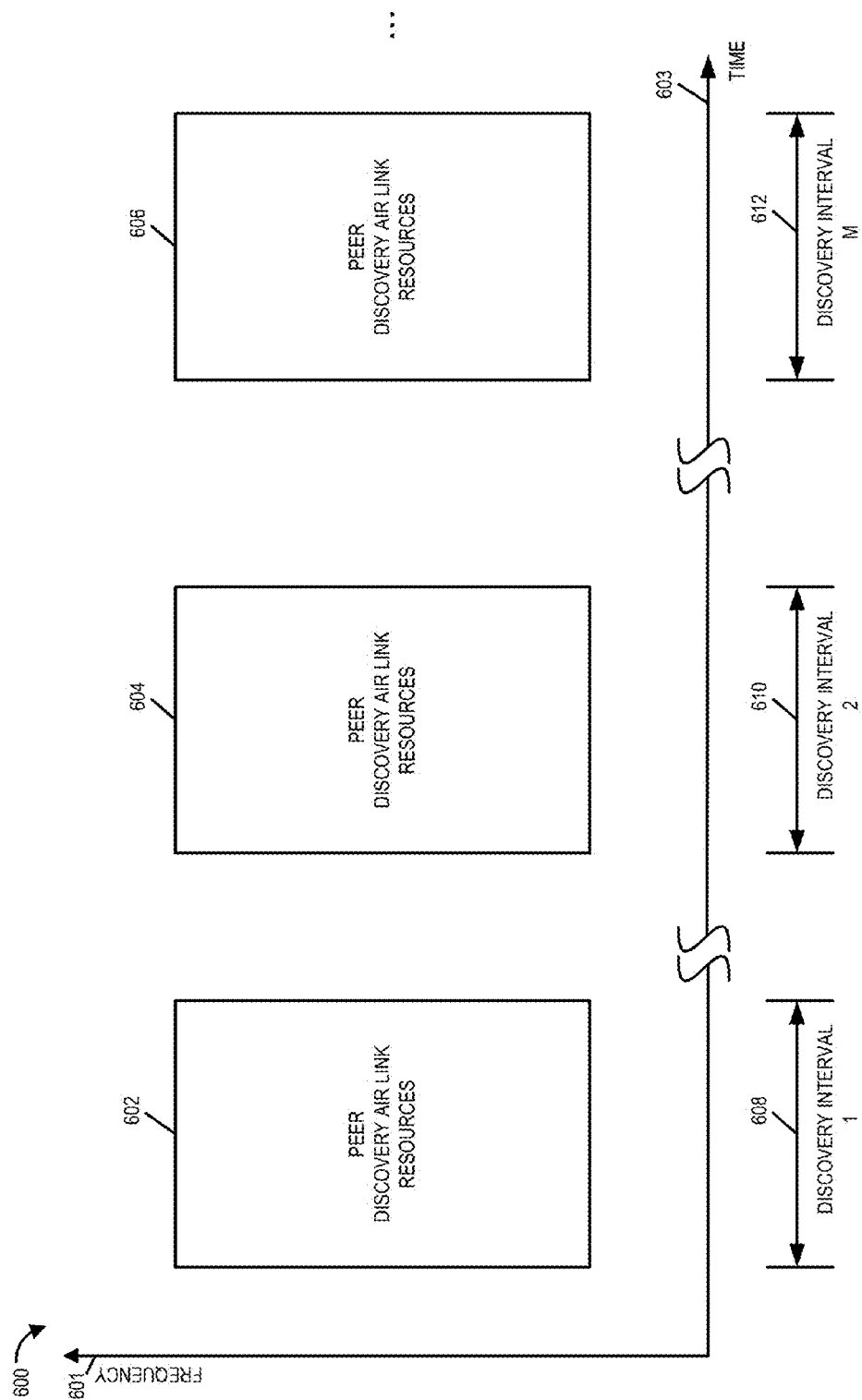
FIG. 6 is a drawing of an exemplary frequency vs time plot illustrating exemplary peer discovery air link resources in an exemplary peer to peer recurring timing structure.

FIG. 6 is a drawing of an exemplary frequency vs time plot 600 illustrating exemplary peer discovery air link resources in an exemplary peer to peer recurring timing structure. Frequency vs time plot 600 include a vertical axis 601 representing frequency, e.g., OFDM tones, and a horizontal axis 603 representing time, e.g., OFDM symbol transmission time intervals. In this example, there are M discovery intervals (discovery interval 1 608, discovery interval 2 610, . . . , discovery interval M 612) in the recurring timing structure. Peer discovery air link resources 602 occurs during discovery interval 1 608; peer discovery air link resources 604 occurs during discovery interval 2 610; and peer discovery air link resources 606 occurs during discovery interval M 612. Peer discovery air link resource 506 of FIG. 5 is, e.g., any of the peer discovery air link resource blocks (602, 604, 606) of FIG. 6.

Figure 7:
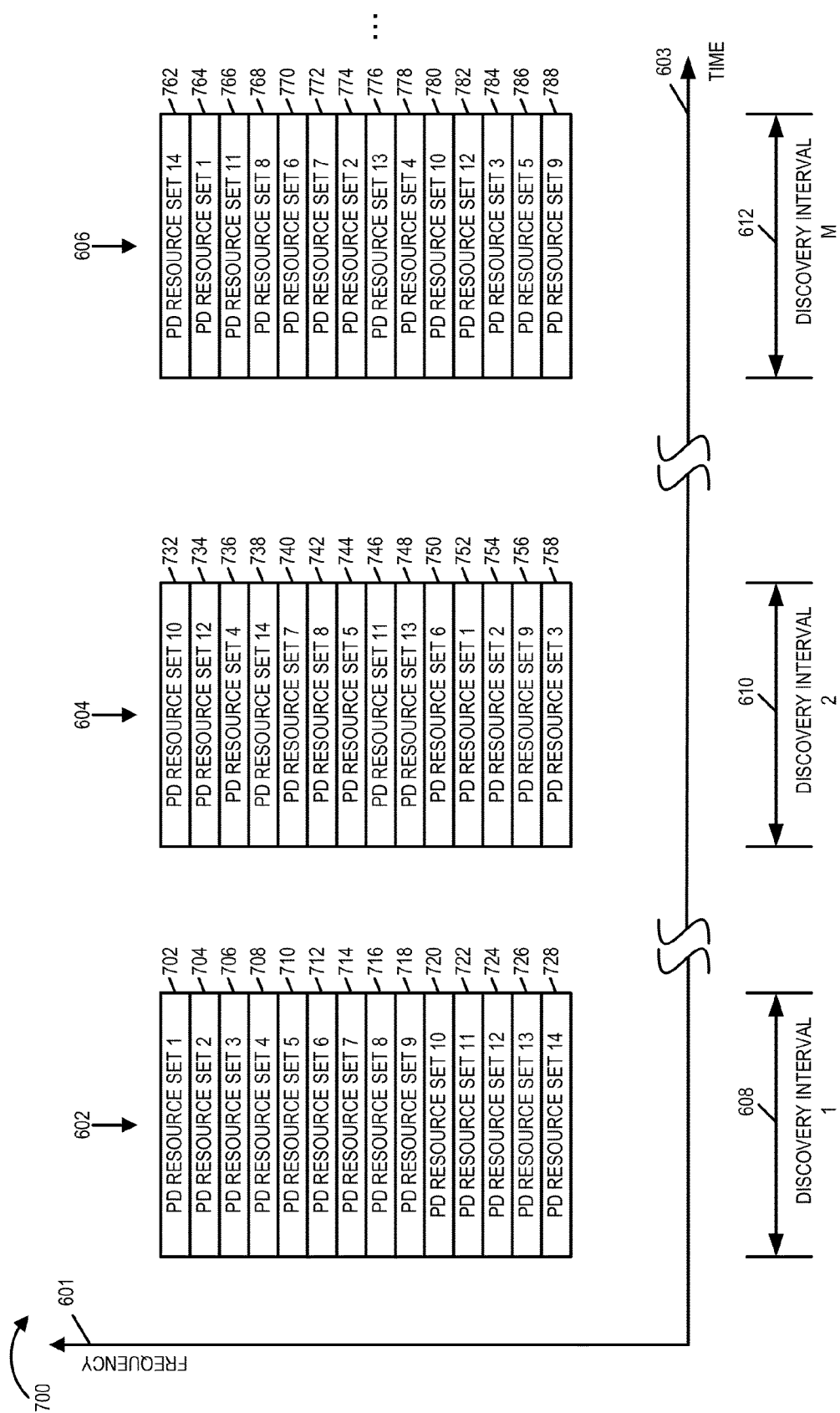
FIG. 7 is a drawing of an exemplary frequency vs time plot illustrating exemplary peer discovery resource sets within the peer discovery resource blocks illustrated in FIG. 6.

FIG. 7 is a drawing of an exemplary frequency vs time plot 700 illustrating exemplary peer discovery resource sets within the peer discovery resource blocks illustrated in FIG. 6. Peer discovery air link resources block 602 includes, in order from highest to lowest frequency, peer discovery resource set 1 702, peer discovery resource set 2 704, peer discovery resource set 3 706, peer discovery resource set 4 708, peer discovery resource set 5 710, peer discovery resource set 6 712, peer discovery resource set 7 714, peer discovery resources set 8 716, peer discovery resource set 9 718, peer discovery resource set 10 720, peer discovery resource set 11 722, peer discovery resource set 12 724, peer discovery resource set 13 726, and peer discovery resource set 14 728. Peer discovery air link resources block 604 includes, in order from highest to lowest frequency, peer discovery resource set 10 732, peer discovery resource set 12 734, peer discovery resource set 4 736, peer discovery resource set 14 738, peer discovery resource set 7 740, peer discovery resource set 8 742, peer discovery resource set 5 744, peer discovery resources set 11 746, peer discovery resource set 13 748, peer discovery resource set 6 750, peer discovery resource set 1 752, peer discovery resource set 2 754, peer discovery resource set 9 756, and peer discovery resource set 3 758. Peer discovery air link resources block 606 includes, in order from highest to lowest frequency, peer discovery resource set 14 762, peer discovery resource set 1 764, peer discovery resource set 11 766, peer discovery resource set 8 768, peer discovery resource set 6 770, peer discovery resource set 7 772, peer discovery resource set 2 774, peer discovery resources set 13 776, peer discovery resource set 4 778, peer discovery resource set 10 780, peer discovery resource set 12 782, peer discovery resource set 3 784, peer discovery resource set 5 786, and peer discovery resource set 9 788.

In the example of FIG. 7, a resource set associated with a peer discovery identifier hops from one tone to another from one peer discovery resource block to another in accordance with a predetermined hopping scheme. A wireless terminal may acquire and hold a peer discovery resource set, corresponding to a peer discovery identifier, for multiple peer discovery resource blocks to use to transmit its peer discovery signals. For example, consider that an exemplary wireless terminal selects peer discovery resource set 1 to use for its peer discovery transmissions, in peer discovery resource block 602 the wireless terminal uses peer discovery resource set 1 702 corresponding to the highest frequency, in peer discovery resource block 2 604 the wireless terminal used peer discovery resource set 1 752 corresponding to the fourth lowest frequency, and in peer discovery resource block 606 the wireless terminal uses peer discovery resource set 1 764 corresponding to the frequency which is 1 step lower than the highest frequency.

In the example of FIG. 7 a peer discovery resource block is partitioned into 14 exemplary peer discovery resource sets. In other examples, a peer discovery resource block may include a different number of peer discovery resource sets. In some such embodiments, a peer discovery resource block includes greater than 100 peer discovery resource sets. In some embodiments, the same peer discovery resource sets are not necessarily included in each successive peer discovery resource block. In some embodiments, there may be multiple peer discovery resource sets corresponding to the same tone in a peer discovery resource block, e.g., a first peer discovery resource set for a first time interval and a second peer discovery resource set for a second time interval.

Figure 8:
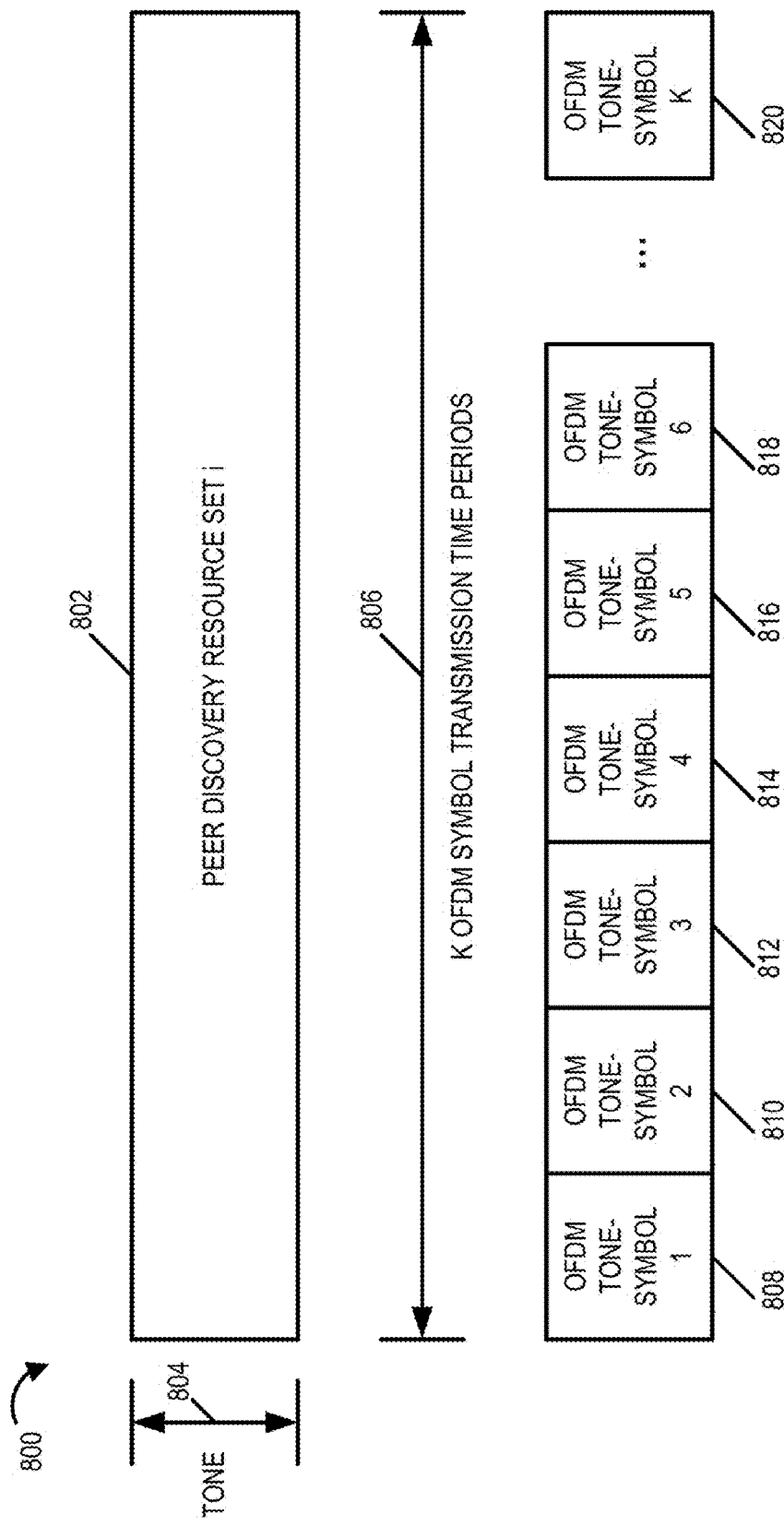
FIG. 8 is a drawing illustrating an exemplary peer discovery resource set, which may be any of the peer discovery resource sets of FIG. 7.

FIG. 8 is a drawing 800 illustrating exemplary peer discovery resource set i 802. Exemplary peer discovery resource set i 802 may be any of the peer discovery resource sets illustrated in FIG. 7. Peer discovery resource set i 802 includes 1 tone 804 for the time duration of K OFDM symbol transmission time periods 806. Exemplary peer discovery resource set i 802 may be represented as K OFDM tone-symbols (OFDM tone-symbol 1 808, OFDM tone-symbol 2 810, OFDM tone-symbol 3 812, OFDM tone-symbol 4 814, OFDM tone-symbol 5 816, OFDM tone-symbol 6 818, . . . , OFDM tone-symbol K 820). Exemplary peer discovery resource set i 802 may be any of the peer discovery resource sets illustrated in FIG. 7. In some embodiments, K is an integer greater than or equal to eight. In one exemplary embodiment K=16, and there are 16 OFDM tone-symbols in a peer discovery resource set. In another exemplary embodiment K=64, and there are 64 OFDM tone-symbols in a peer discovery resource set. In some embodiments, $K_P$ of the K tone-symbols are pilot tone-symbols, where $K/K_P \geq 4$. In one embodiment K=64 and $K_P=8$. In some embodiments, the full set of K tone-symbols correspond to the same tone.

Figure 9:
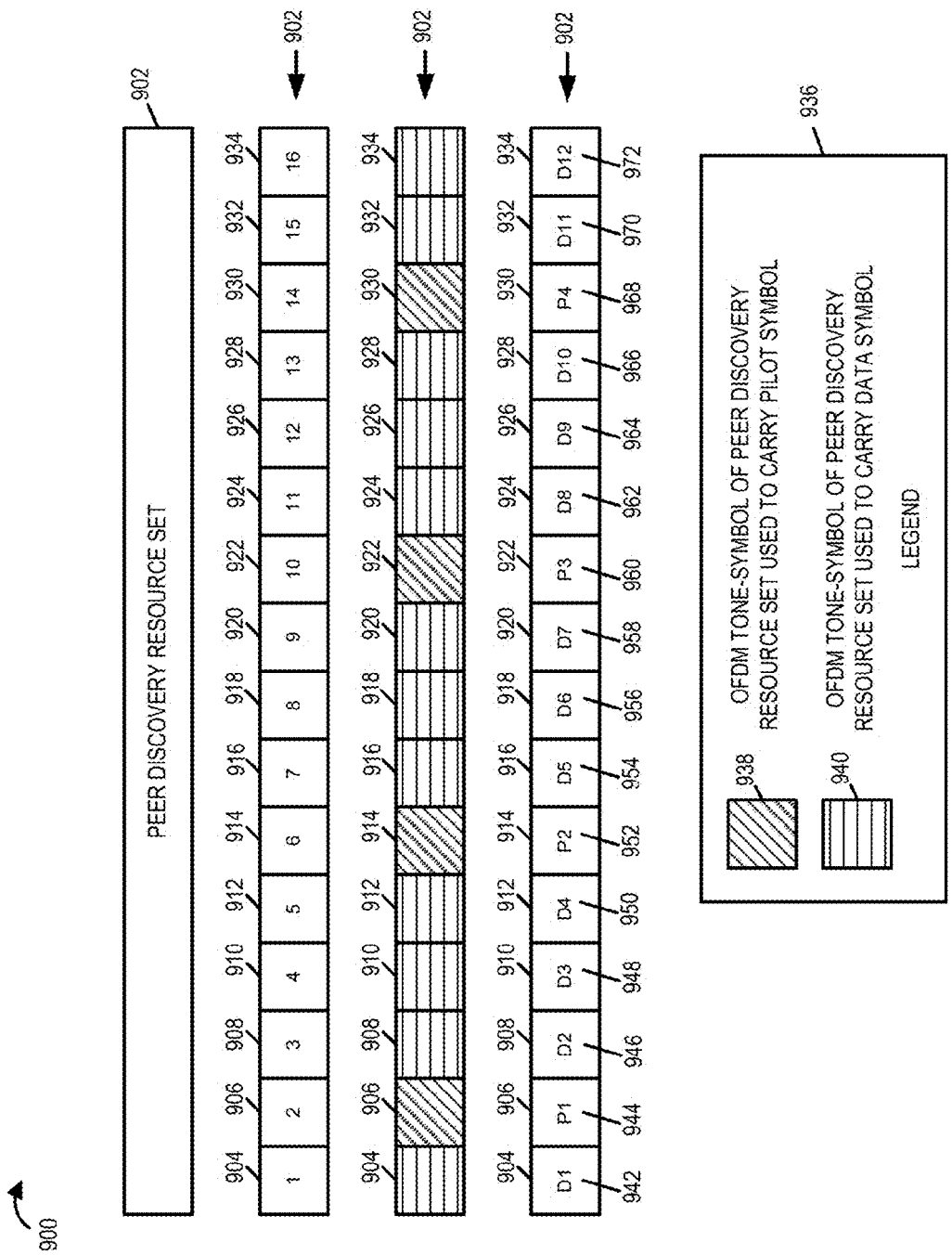
FIG. 9 is a drawing illustrating an exemplary peer discovery resource set used to carry pilot and data symbols.

FIG. 9 is a drawing 900 illustrating an exemplary peer discovery resource set 902 used to carry pilot and data symbols. Peer discovery resource set 902 is, e.g., peer discovery resource set 804 of FIG. 8, where K=16 and Kp=4. Exemplary peer discovery resource set 902 includes 16 indexed OFDM tone-symbols (tone-symbol 1 904, tone symbol 2 906, tone-symbol 3 908, tone-symbol 4 910, tone-symbol 5 912, tone-symbol 6 914, tone-symbol 7 916, tone-symbol 8 918, tone-symbol 9 920, tone-symbol 10 922, tone-symbol 11 924, tone-symbol 12 926, tone-symbol 13 928, tone-symbol 14 930, tone-symbol 15 932 and tone-symbol 16 934).

Diagonal line shading, as indicated by box 938 of legend 936, indicates that an OFDM tone-symbol of the peer discovery resource set is used to carry a pilot symbol. Horizontal line shading, as indicated by box 940 of legend 936, indicates that an OFDM tone-symbol of the peer discovery resource set is used to carry a data symbol. In this example a first subset of tone-symbols (906, 914, 922 and 930) are designated to be used to carry pilot symbols, while a second non-overlapping subset of tone-symbols (904, 908, 910, 912, 916, 918, 920, 924, 926, 928, 932, 934) are used to carry the data symbols. In this example, the spacing between pilot designated tone-symbols is uniform with multiple data symbol designated tone-symbols being interspaced between the pilot designated tone-symbols. In some embodiments, the spacing between pilot designated tone-symbols is substantially uniform. In one embodiment, the tone-symbols designated to carry pilot symbols temporally precede the tone-symbols designated to carry data symbols. In some embodiments, the first and last tone-symbols of the peer discovery resource set are designated to carry pilot symbols.

In the example of FIG. 9, tone-symbols (906, 914, 922 and 930) carry pilot symbols (P1 944, P2 952, P3 960 and P4 968), respectively. In the example of FIG. 9, tone-symbols (904, 908, 910, 912, 916, 918, 920, 924, 926, 928, 932, 934) carry data symbols (D1 942, D2 946, D3 948, D4 950, D5 954, D6 956, D7 958, D8 962, D9 964, D10 966, D11 970, D12 972), respectively.

Figure 10:
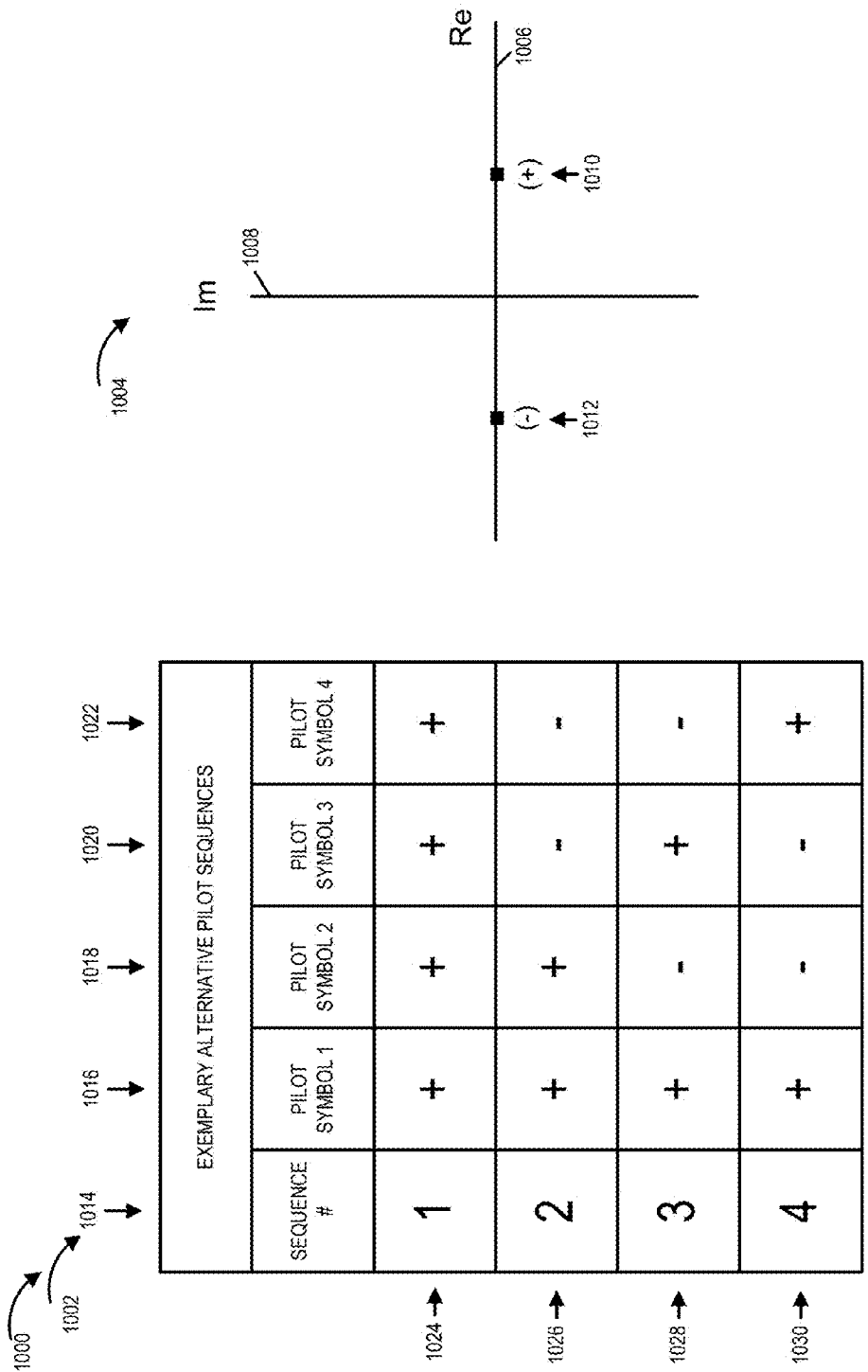
FIG. 10 is a drawing illustrating a table of exemplary alternative pilot sequences and a plot illustrating mapping of a set of two pilot symbols to a complex plane.

FIG. 10 is a drawing 1000 illustrating a table of exemplary alternative pilot sequences 1002 and a plot illustrating mapping of a set of two pilot symbols to a complex plane. Plot 1004 includes horizontal axis 1006 representing the real axis and vertical axis 1008 representing the Imaginary axis. Pilot symbol designated as "+" 1010 maps along the real axis with a phase angle of 0 degrees, while a pilot symbol designated as "−" 1012 maps along the real axis with a phase angle of 180 degrees. The transmit power level of the "+" pilot symbol is the same as the transmit power level of the "−" pilot symbol.

Table 1002 includes a first column 1014 representing pilot sequence number, a second column 1016 identifying pilot symbol 1 for each of the alternative pilot sequences, a third column 1018 identifying pilot symbol 2 for each of the alternative pilot sequences, a fourth column 1020 identifying pilot symbol 3 for each of the alternative pilot sequences, and a fifth column 1022 identifying pilot symbol 4 for each of the alternative pilot sequences. First row 1024 indicates that pilot sequence 1 follows the pattern +, +, +, +. Second row 1026 indicates that pilot sequence 2 follows the pattern +, +, −, −. Third row 1028 indicates that pilot sequence 3 follows the pattern +, −, +, −. Fourth row 1030 indicates that pilot sequence 4 follows the pattern +, −, −, +.

Figure 11:
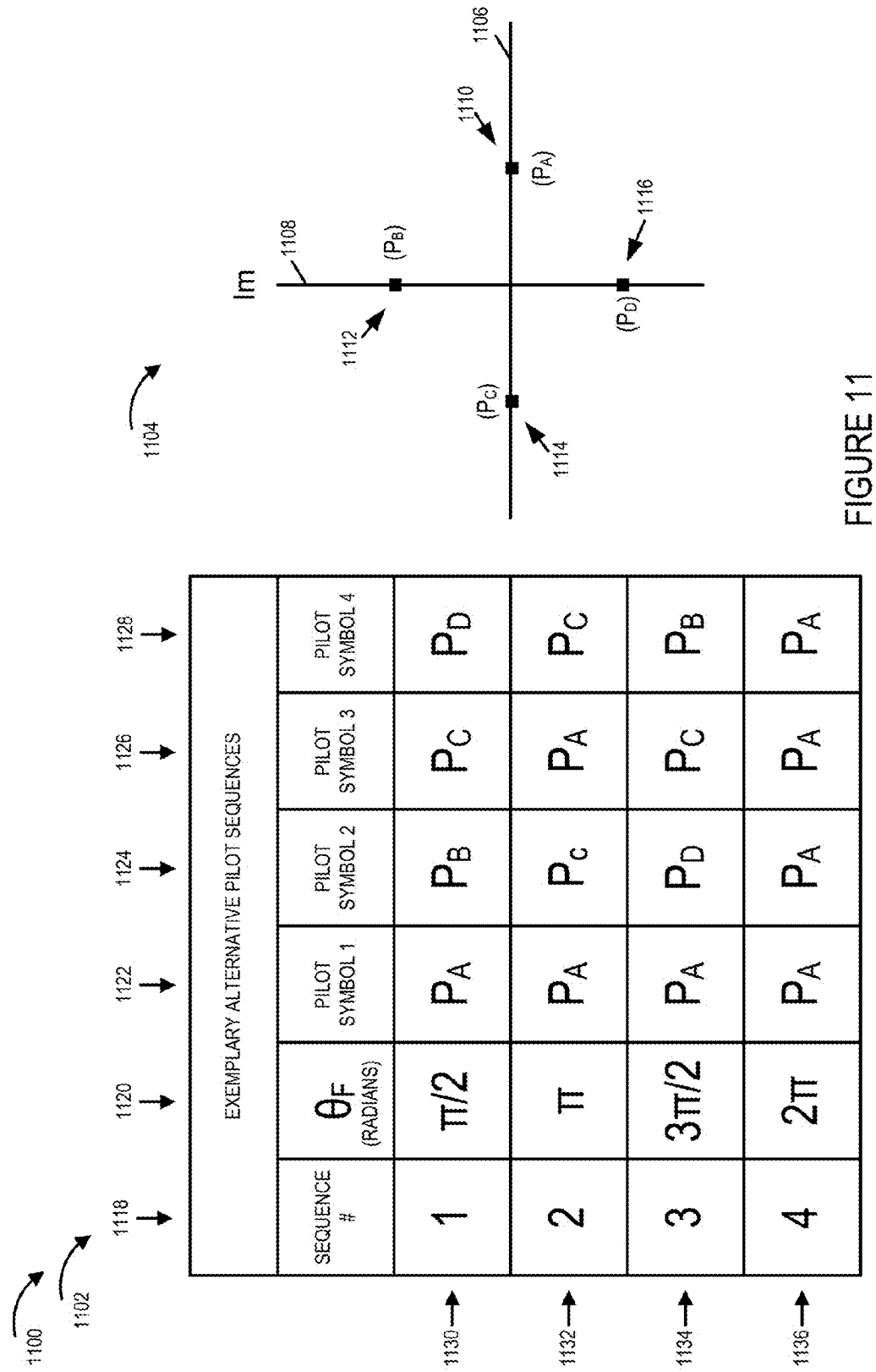
FIG. 11 is a drawing illustrating a table of exemplary alternative pilot sequences and a plot illustrating mapping of a set of four pilot symbols to a complex plane.

FIG. 11 is a drawing 1100 illustrating a table of exemplary alternative pilot sequences 1102 and a plot illustrating mapping of a set of four pilot symbols to a complex plane. The FIG. 11 embodiment is an alternative to the FIG. 10 embodiment. Plot 1104 includes horizontal axis 1106 representing the real axis and vertical axis 1108 representing the Imaginary axis. Pilot symbol 1110 designated as "$P_A$" maps along the positive real axis corresponding to a phase angle of 0 degrees. Pilot symbol 1112 designated as "$P_B$" maps along the positive Imaginary axis corresponding to a phase angle of 90 degrees. Pilot symbol 1114 designated as "$P_C$" maps along the negative real axis corresponding to a phase angle of 180 degrees. Pilot symbol 1116 designated as "$P_D$" maps along the negative Imaginary axis corresponding to a phase angle of 270 degrees. The transmit power level for each of the pilot symbols $P_A$, $P_B$, $P_C$ and $P_D$ is the same.

Table 1102 includes: a first column 1118 representing pilot sequence number, a second column 1120 identifying the amount of phase rotation in radians between successive pilot symbols in a pilot sequence, a third column 1122 identifying pilot symbol 1 for each of the alternative pilot sequences, a fourth column 1124 identifying pilot symbol 2 for each of the alternative pilot sequences, a fifth column 1126 identifying pilot symbol 3 for each of the alternative pilot sequences, a sixth column 1128 identifying pilot symbol 4 for each of the alternative pilot sequences. First row 1130 indicates that pilot sequence 1 corresponds to a phase rotation of $\pi/2$ and follows the pattern $P_A$, $P_B$, $P_C$, $P_D$. Second row 1132 indicates that pilot sequence 2 corresponds to a phase rotation of $\pi$ and follows the pattern $P_A$, $P_C$, $P_A$, $P_C$. Third row 1134 indicates that pilot sequence 3 corresponds to a phase rotation of $3\pi/2$ and follows the pattern $P_A$, $P_D$, $P_C$, $P_B$. Fourth row 1136 indicates that pilot sequence 4 corresponds to a phase rotation of $2\pi$ and follows the pattern $P_A$, $P_A$, $P_A$, $P_A$.

FIGS. 10 and 11 are examples in which there are four pilot sequences and four pilots per sequence. In other embodiments, there may be different numbers of alternative pilot sequences available for selection and/or different numbers of pilots per sequence.

Figure 12:
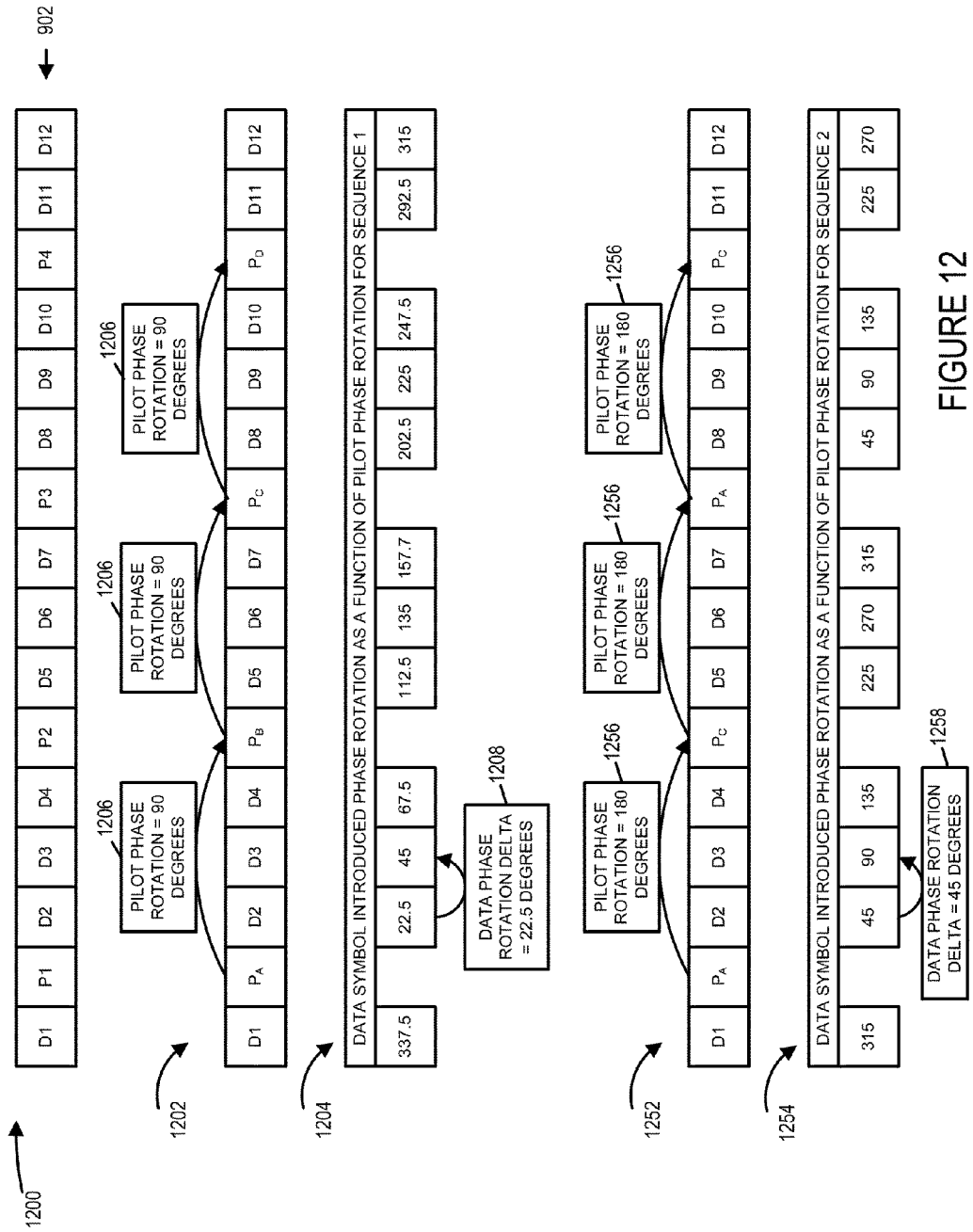
FIG. 12 is a drawing illustrating two examples in which a pilot sequence of FIG. 11 is selected for transmission in an exemplary peer discovery resource set described with respect to FIG. 9.

FIG. 12 is a drawing 1200 illustrating two examples in which a pilot sequence from the table 1102 of FIG. 11 is selected for transmission in an exemplary peer discovery resource set 902 described with respect to FIG. 9. Drawings 1202 and 1204 illustrate an example in which alternative pilot sequence 1 of row 1130 is selected for transmission. In this example, drawing 1202 illustrates that there is a first uniform phase shift of 90 degrees, as indicated by box 1206, between successive pilot symbols in the sequence. Drawing 1204 illustrates that there is a second uniform phase rotation of 22.5 degrees, as indicated by box 1208, which is a function of the first uniform phase rotation, introduced into data symbols to be transmitted with regard to a reference constellation. The reference constellation used for the data symbols of the peer discovery resource set is, e.g., a QAM constellation, e.g., one of a QAM 4, QAM 16, QAM 64 or QAM 256 constellation.

Drawings 1252 and 1254 illustrate an example in which alternative pilot sequence 2 of row 1132 is selected for transmission. In this example, drawing 1252 illustrates that there is a first uniform phase shift of 180 degrees, as indicated by box 1256, between successive pilot symbols in the sequence. Drawing 1254 illustrates that there is a second uniform phase rotation of 45 degrees, as indicated by box 1258, which is a function of the first uniform phase rotation, introduced into data symbols to be transmitted with regard to a reference constellation.

Figure 13:
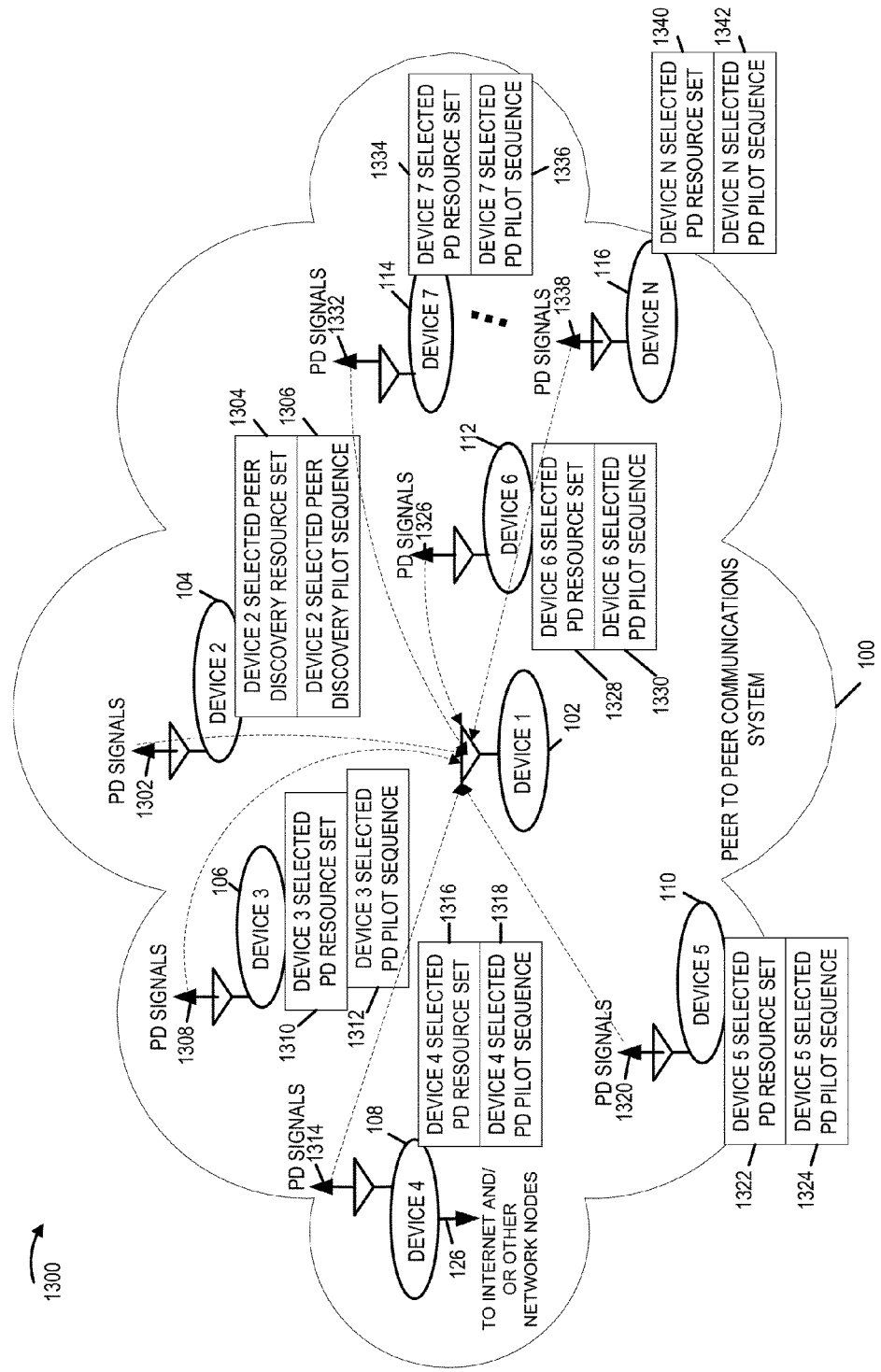
FIG. 13 is a drawing illustrating an example in which device 1 of the system of FIG. 1 decides that it would like to transmit, e.g., broadcast, peer discovery information, monitors a plurality of different sets of peer discovery resources, and selects a peer discovery resource set and a peer discovery pilot sequence as a function of the monitored information.

FIG. 13 is a drawing 1300 illustrating an example in which device 1 102 of system 100 of FIG. 1 decides that it would like to transmit, e.g., broadcast, peer discovery information, monitors a plurality of different sets of peer discovery resources, and selects a peer discovery resource and a peer discovery pilot sequence as a function of the monitored information. Device 1 102 may implement a communications method in accordance with flowchart 200 of FIG. 2 and/or be implemented in accordance with device 300 of FIG. 3. Device 1 102 would like to transmit its discovery signals such as to be detectable by other devices in its vicinity, while limiting its interference impact to the successful communication of other peer discovery signaling already in progress.

In the example of FIG. 13, devices (device 2 104, device 3 106, device 4 108, device 5 110, device 6 112, device 7 114, . . . , device N 116) have each already selected a peer discovery resource set and a peer discovery pilot sequence and are transmitting generated peer discovery signals including pilots symbols and data symbols. The pilot symbols are in accordance with the selected pilot sequence, and the pilot symbols and the data symbols are communicated using the air link resources, e.g., set of OFDM tone-symbols, of the selected peer discovery resource set.

Device 2 104 transmits its peer discovery signals 1302 in accordance with device 2 selected peer discovery resource set 1304 and device 2 selected peer discovery pilot sequence 1306. Device 3 106 transmits its peer discovery signals 1308 in accordance with device 3 selected peer discovery resource set 1310 and device 3 selected peer discovery pilot sequence 1312. Device 4 108 transmits its peer discovery signals 1314 in accordance with device 4 selected peer discovery resource set 1316 and device 4 selected peer discovery pilot sequence 1318. Device 5 110 transmits its peer discovery signals 1320 in accordance with device 5 selected peer discovery resource set 1322 and device 5 selected peer discovery pilot sequence 1324. Device 6 112 transmits its peer discovery signals 1326 in accordance with device 6 selected peer discovery resource set 1328 and device 6 selected peer discovery pilot sequence 1330. Device 7 114 transmits its peer discovery signals 1332 in accordance with device 7 selected peer discovery resource set 1334 and device 7 selected peer discovery pilot sequence 1336. Device N 116 transmits its peer discovery signals 1338 in accordance with device N selected peer discovery resource set 1340 and device N selected peer discovery pilot sequence 1342.

Some of the devices may have selected and may be using the same peer discovery resource set. For example, device 4 108 and device N 116 may be concurrently using the same peer discovery resource set, e.g. with different selected pilot sequences.

Device 1 102 monitors a plurality of different sets of peer discovery communications resources and receives signals (1302, 1308, 1314, 1320, 1326, 1332, 1338), as indicated by the dashed line arrows. Device 1 determines an amount of energy associated with at least a portion of the plurality of different sets of peer discovery resources and selects a set of communications resources to use for communication, e.g., a set of communications resources to use for its transmission of its intended peer discovery signals. Device 1 102, also selects a peer discovery pilot sequence to use for its intended peer discovery signaling. In one embodiment, device 1 102 makes a pseudo random selection of the pilot sequence to use. In another embodiment, device 1 102 selects the pilot sequence based on determined energy associated with different received pilot sequences corresponding to the selected peer discovery resource set.

Device 1 102 generates and transmits pilot symbols and data symbols in accordance with the selected pilot sequence. The transmission is over the set of air link communications resources, e.g., set of contiguous OFDM tone-symbols, which correspond to the selected set of communications resources which was selected by device 1 102.

Figure 14:
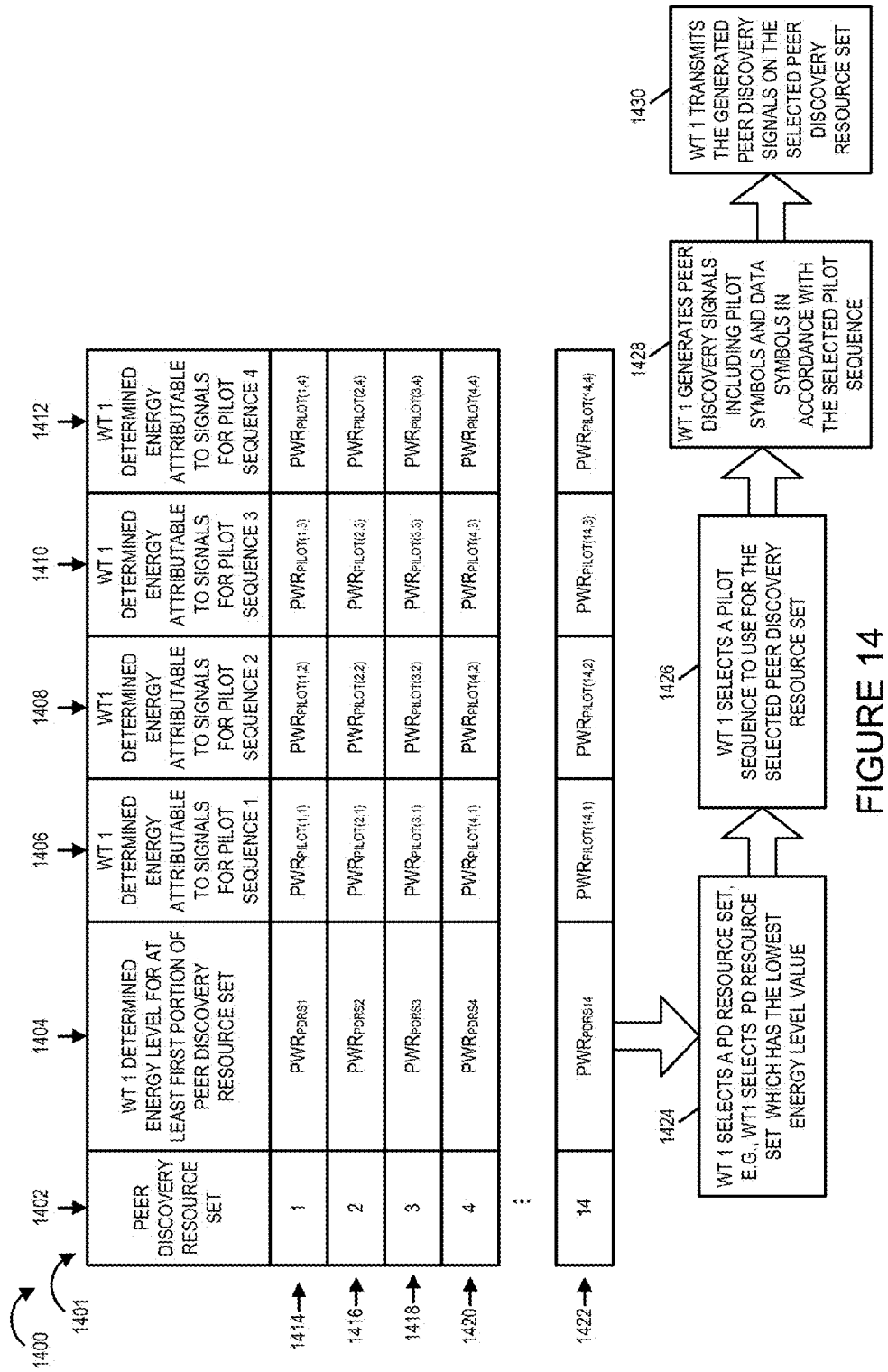
FIG. 14 is a drawing illustrating exemplary wireless terminal 1 measurements and operations corresponding to the FIG. 13 exemplary scenario.

FIG. 14 is a drawing 1400 illustrating exemplary wireless terminal 1 measurements and operations corresponding to the FIG. 13 exemplary scenario. Drawing 1400 includes table 1401 listing WT determined energy levels associated with different peer discovery resources and/or different pilot sequences based on received signal measurements. First column 1402 identifies the peer discovery resource set. Second column 1404 lists WT 1 determined energy level for at least a first portion of the peer discovery resource set. Third column 1406 lists WT 1 determined energy attributable to signals for pilot sequence 1. Fourth column 1408 lists WT 1 determined energy attributable to signals for pilot sequence 2. Fifth column 1410 lists WT 1 determined energy attributable to signals for pilot sequence 3. Sixth column 1412 lists WT 1 determined energy attributable to signals for pilot sequence 4.

First row 1414 lists that: the determined energy level for at least a first portion of peer discovery resource set 1 is $PWR_{PDRS1}$, the WT 1 determined energy attributable to signals for pilot sequence 1 corresponding to peer discovery resource set 1 is $PWR_{Pilot(1,1)}$, the WT 1 determined energy attributable to signals for pilot sequence 2 corresponding to peer discovery resource set 1 is $PWR_{Pilot(1,2)}$, the WT 1 determined energy attributable to signals for pilot sequence 3 corresponding to peer discovery resource set 1 is $PWR_{Pilot(1,3)}$, and the WT 1 determined energy attributable to signals for pilot sequence 4 corresponding to peer discovery resource set 1 is $PWR_{Pilot(1,4)}$. Second row 1416 lists that: the determined energy level for at least a first portion of peer discovery resource set 2 is $PWR_{PDRS2}$, the WT 1 determined energy attributable to signals for pilot sequence 1 corresponding to peer discovery resource set 2 is $PWR_{Pilot(2,1)}$, the WT 1 determined energy attributable to signals for pilot sequence 2 corresponding to peer discovery resource set 2 is $PWR_{Pilot(2,2)}$, the WT 1 determined energy attributable to signals for pilot sequence 3 corresponding to peer discovery resource set 2 is $PWR_{Pilot(2,3)}$, and the WT 1 determined energy attributable to signals for pilot sequence 4 corresponding to peer discovery resource set 2 is $PWR_{Pilot(2,4)}$.

Third row 1418 lists that: the determined energy level for at least a first portion of peer discovery resource set 3 is $PWR_{PDRS3}$, the WT 1 determined energy attributable to signals for pilot sequence 1 corresponding to peer discovery resource set 3 is $PWR_{Pilot(3,1)}$, the WT 1 determined energy attributable to signals for pilot sequence 2 corresponding to peer discovery resource set 3 is $PWR_{Pilot(3,2)}$, the WT 1 determined energy attributable to signals for pilot sequence 3 corresponding to peer discovery resource set 3 is $PWR_{Pilot(3,3)}$, and the WT 1 determined energy attributable to signals for pilot sequence 4 corresponding to peer discovery resource set 3 is $PWR_{Pilot(3,4)}$. Fourth row 1420 lists that: the determined energy level for at least a first portion of peer discovery resource set 4 is $PWR_{PDRS4}$, the WT 1 determined energy attributable to signals for pilot sequence 1 corresponding to peer discovery resource set 4 is $PWR_{Pilot(4,1)}$, the WT 1 determined energy attributable to signals for pilot sequence 2 corresponding to peer discovery resource set 4 is $PWR_{Pilot(4,2)}$, the WT 1 determined energy attributable to signals for pilot sequence 3 corresponding to peer discovery resource set 4 is $PWR_{Pilot(4,3)}$, and the WT 1 determined energy attributable to signals for pilot sequence 4 corresponding to peer discovery resource set 4 is $PWR_{Pilot(4,4)}$. Fourteenth Row 1422 lists that: the determined energy level for at least a first portion of peer discovery resource set 14 is $PWR_{PDRS14}$, the WT 1 determined energy attributable to signals for pilot sequence 1 corresponding to peer discovery resource set 14 is $PWR_{Pilot(14,1)}$, the WT 1 determined energy attributable to signals for pilot sequence 2 corresponding to peer discovery resource set 14 is $PWR_{Pilot(14,2)}$, the WT 1 determined energy attributable to signals for pilot sequence 3 corresponding to peer discovery resource set 14 is $PWR_{Pilot(14,3)}$, and the WT 1 determined energy attributable to signals for pilot sequence 4 corresponding to peer discovery resource set 14 is $PWR_{Pilot(14,4)}$.

In one embodiment column 1404 of table 1401 has been filled out by wireless terminal 1 based on measurements of received peer discovery signals obtained from the monitoring of a plurality of different sets of communications resources, e.g., in accordance with step 204 of flowchart 200 of FIG. 2. In some embodiments the information of column 1404 is based on received signals from resources, e.g., OFDM tone-symbols, designated as pilot symbol and data symbol resources. In some embodiments the information of column 1402 is based on received signals from resources designated as pilot symbol resources but does not include resources designated as data symbol resources. In some embodiments, the information of column 1404 is based on a full peer discovery resource set, e.g., $PWR_{PDRS1}$ is, in some embodiments, is based on signals received over the full set of 16 OFDM tone-symbols corresponding to resource set 1.

In one embodiment column 1406, 1408, 1410 and 1412 of table 1401 has been filled out by wireless terminal 1 based on the determinations of energy attributable to signals corresponding to different ones of said plurality of different pilot sequences, e.g., in accordance with step 210 of flowchart 200 of FIG. 2. The information of columns 1406, 1408, 1410 and 1412 is based on received signals corresponding to designated pilot symbol locations in the peer discovery resource sets. In addition, corresponding to an individual peer discovery resource set, wireless terminal 1 has separated the received pilot symbol signals to obtain power levels corresponding to each pilot sequence.

Box 1424 indicates that WT 1 selects a peer discovery resource set based on the determined energy level information of column 1404. For example, WT 1 selects a peer discovery resource set to use for its transmission of peer discovery signals based on the determined energy levels corresponding to the 14 alternative resource sets. In one embodiment, WT 1 selects the resource set which has the lowest energy level value. In another embodiment, WT 1 determines which of the peer discovery resource sets have a determined energy level below a predetermined threshold, and then WT 1 pseudo-randomly selects a peer discovery resource set to use from among those determined to be below the predetermined threshold. Box 1424 may correspond to step 208 of FIG. 2.

Following selection of a peer discovery resource set, WT 1 selects a pilot sequence to use for the selected peer discovery resource set, as indicated by box 1426. Box 1426 may correspond to step 212 of flowchart 200 of FIG. 2. In some embodiments, WT 1 makes a pseudo-random selection of one of the plurality of different pilot sequences, e.g., 1 of the four alternative pilot sequences. This scenario is represented by sub-step 214 of flowchart 200 of FIG. 2. In another embodiment, WT 1 selects one of the plurality of different pilot sequences based on the determined amount of energy attributable to the different individual ones of the plurality of pilot sequences. This scenario is represented by sub-step 216 of flowchart 200 of FIG. 2. For example, consider that WT 1 has selected to use peer discovery resource set 2, then WT 1 selects the pilot sequence as a function of: $PWR_{PILOT(2,1)}$, $PWR_{PILOT(2,2)}$, $PWR_{PILOT(2,3)}$, $PWR_{PILOT(2,4)}$. In some embodiments, WT 1 selects the pilot sequence from among the four alternatives which has the lowest amount of energy which is attributed to it. This scenario is represented by subset 218 of flowchart 200. In another embodiment, WT 1 selects the pilot sequence from among a predetermined number of the lowest energy level pilot sequences. For example, WT 1 pseudo-randomly selects the pilot sequence to use from among the two lowest power pilot sequences.

Following selection of the pilot sequence, WT 1 generates peer discovery signals including pilot symbols and data symbols in accordance with selected pilot sequence, as indicated by box 1428. In some embodiments, the generated data symbols are a function of the pilot symbols, e.g., with regard to phase. For example, consider that the embodiment uses pilot sequences as described with respect to FIG. 11 and FIG. 12. In such a scenario, phase shift applied to data symbols is a function of phase shift corresponding to pilot symbols.

The generated peer discovery signals including pilot symbols and data symbols are transmitted using the selected peer discovery resource set as indicted by box 1430. Thus WT 1 102 of FIG. 13, which now has a selected peer discovery resource set and a selected pilot sequence, transmits its peer discovery signals.

Figure 15:
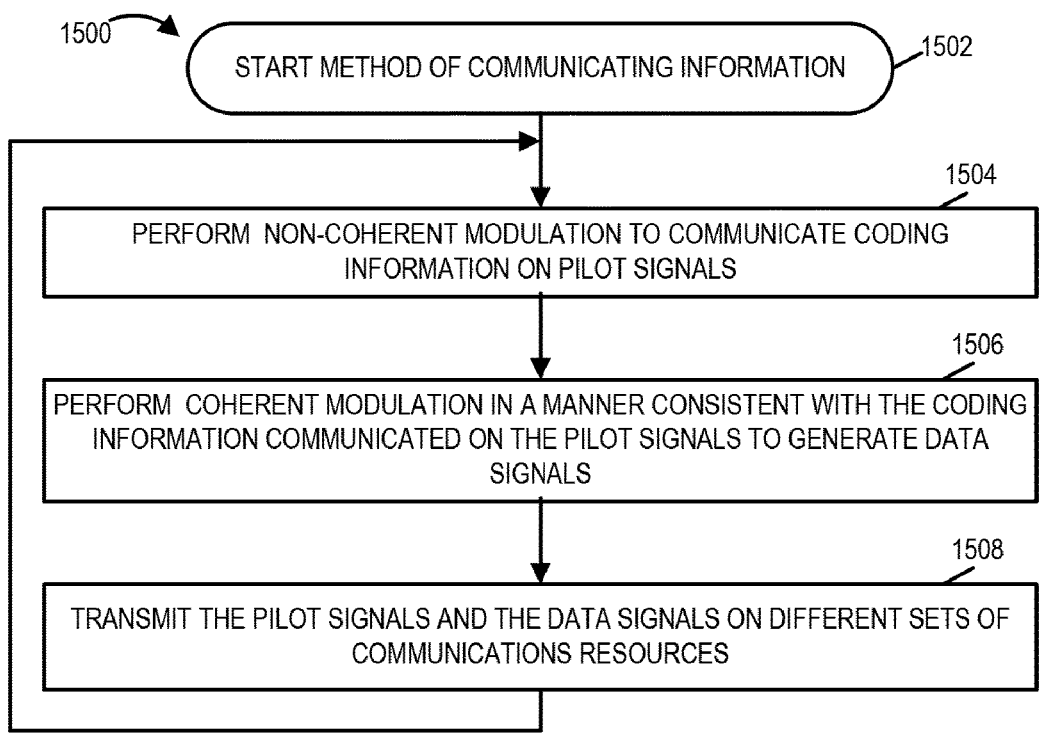
FIG. 15 is a flowchart an exemplary method of operating a communications device to communicate information in accordance with an exemplary embodiment.

FIG. 15 is a flowchart 1500 an exemplary method of operating a communications device to communicate information in accordance with an exemplary embodiment. The exemplary communications device implementing the method of flowchart 1500 is, e.g., one of the communications devices of system 100 of FIG. 1. Operation starts in step 1502, where the communications device is powered on and initialized and proceeds to step 1504. In step 1504, the communications device performs non-coherent modulation to communicate coding information on pilot signals. Operation proceeds from step 1504 to step 1506. In step 1506 the communications device performs coherent modulation in a manner consistent with the coding information communicated on the pilot signals to generate data signals. Operation proceeds from step 1506 to step 1508. In step 1508 the communications device transmit the pilot signals and data signal on different sets of communications resources. Operation proceeds from step 1508 to step 1504.

In some embodiment the coding information communicated in the pilot signals includes information indicating one of a plurality of possible codes used to code data transmitted using the coherent modulation. In some embodiments said plurality of possible codes correspond to different graphical structures. In some embodiments, the possible codes include multiple different LDPC codes. In some such embodiments, the different LDPC codes correspond to different code graph structures.

In some embodiments, the coding information includes interleaving information, said interleaving information indicating one of a plurality of different interleaving methods which may be used to interleave data prior to transmission using said coherent modulation. In some exemplary embodiments, coding before modulation is initially performed or coded modulation is initially performed, e.g., via a convolution encoder, to generate coded symbols from input data to be communicated. Then the generated coded symbols are interleaved using a specific selected interleaving method. In various embodiments the coding information communicated on the pilot signals indicates the type of data transmitted using the coherent modulation, different types of data being coded using different coding methods according to a predetermined relationship between the type of data and the coding method used.

Figure 16:
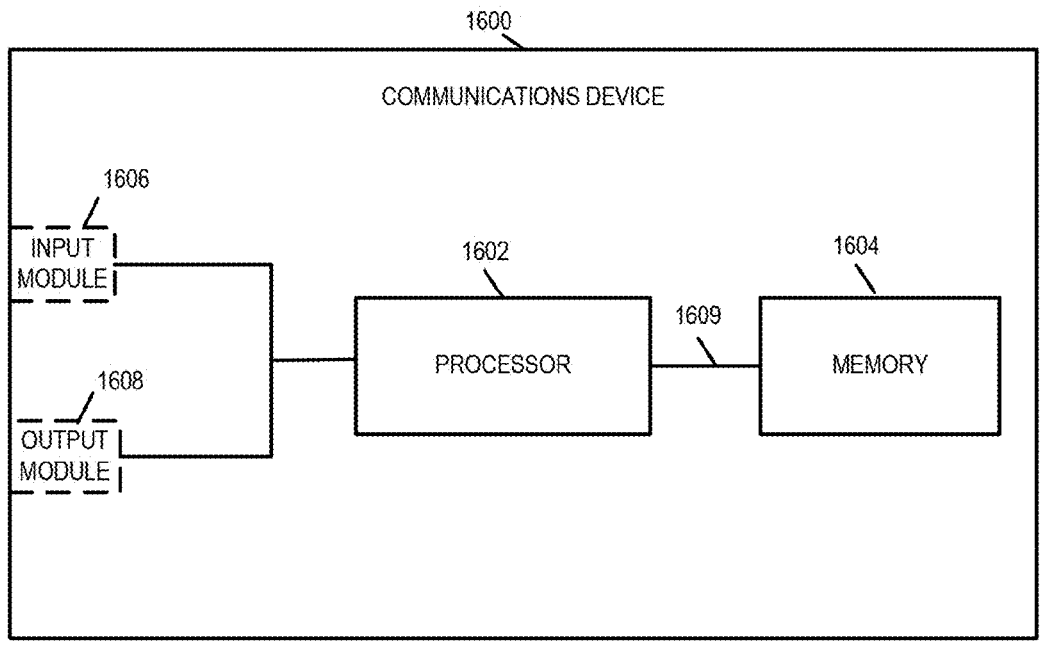
FIG. 16 is a drawing of an exemplary communications device, in accordance with an exemplary embodiment.

FIG. 16 is a drawing of an exemplary communications device 1600, in accordance with an exemplary embodiment. Exemplary communications device 1600 is, e.g., one of the wireless communications devices of FIG. 1. Exemplary communications device 1600 may, and sometimes does, implement a method in accordance with flowchart 1500 of FIG. 15.

Communications device 1600 includes a processor 1602 and memory 1604 coupled together via a bus 1609 over which the various elements (1602, 1604) may interchange data and information. Communications device 1600 further includes an input module 1606 and an output module 1608 which may be coupled to processor 1602 as shown. However, in some embodiments, the input module 1606 and output module 1608 are located internal to the processor 1602. Input module 1606 can receive input signals. Input module 1606 can, and in some embodiments does, include a wireless receiver and/or a wired or optical input interface for receiving input. Output module 1608 may include, and in some embodiments does include, a wireless transmitter and/or a wired or optical output interface for transmitting output.

Processor 1602 is configured to: perform non-coherent modulation to communicate coding information on pilot signals; perform coherent modulation in a manner consistent with the coding information communicated on the pilot signal to generated data signals; and transmit the pilot signals and the data signals on different sets of communications resources. In some embodiments, said coding information communicated on the pilot signals includes information indicating one of a plurality of possible codes used to code data transmitted using said coherent modulation. In some embodiments, the plurality of possible codes correspond to different graphical structures. In various embodiments, said possible codes include multiple different LDPC codes. In some such embodiments, said different LDPC codes correspond to different code graph structures.

In some embodiments, said coding information includes interleaving information, said interleaving information indicating one of a plurality of different interleaving methods which may be used to interleave data prior to transmission using said coherent modulation. In some such embodiments, said coding information communicated on the pilot signals indicates the type of data transmitted using said coherent modulation, different types of data being coded using different coding methods according to a predetermined relationship between the type of data and the coding method used.

In some embodiments, said coding information indicates a combination of a convolutional code and an interleaving pattern. In some embodiments, individual codes are identical or complementary convolutional codes followed by different or random or pseudo-random interleaving.

Figure 17:
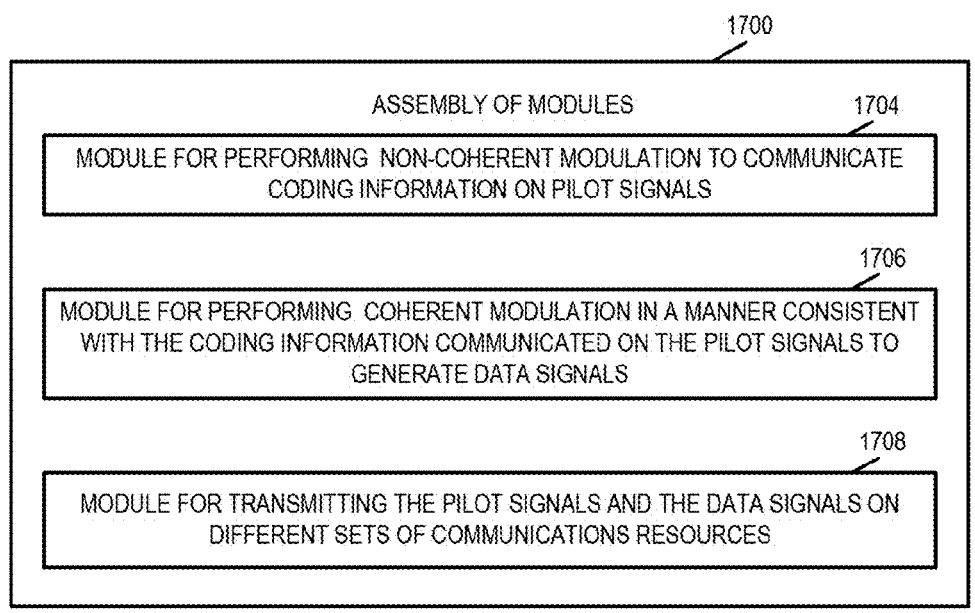
FIG. 17 is an assembly of modules which can, and in some embodiments is, used in the communications device illustrated in FIG. 16.

FIG. 17 is an assembly of modules 1700 which can, and in some embodiments is, used in the communications device 1600 illustrated in FIG. 16. The modules in the assembly 1600 can be implemented in hardware within the processor 1602 of FIG. 16, e.g., as individual circuits. Alternatively, the modules may be implemented in software and stored in the memory 1604 of the communications device 1600 shown in FIG. 16. While shown in the FIG. 16 embodiment as a single processor, e.g., computer, it should be appreciated that the processor 1602 may be implemented as one or more processors, e.g., computers. When implemented in software the modules include code, which when executed by the processor, configure the processor, e.g., computer, 1602 to implement the function corresponding to the module. In some embodiments, processor 1602 is configured to implement each of the modules of the assembly of modules 1600. In embodiments where the assembly of modules 1700 is stored in the memory 1604, the memory 1604 is a computer program product comprising a computer readable medium comprising code, e.g., individual code for each module, for causing at least one computer, e.g., processor 1602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 16 control and/or configure the communications device 1600 or elements therein such as the processor 1602, to perform the functions of the corresponding steps illustrated in the method flowchart 1500 of FIG. 15.

FIG. 17 is an assembly of modules 1700 including a module 1704 for performing non-coherent modulation to communicate coding information on pilot signals and a module 1706 for performing coherent modulation in a manner consistent with the coding information communicated on the pilot signals to generate data signals. Assembly of modules 1700 further includes a module 1708 for transmitting the pilot signals on different sets of communications resources.

In some embodiments, said coding information communicated on the pilot signals includes information indicating one of a plurality of possible codes used to code data transmitted using said coherent modulation. In some embodiment said plurality of possible codes correspond to different graphical structures. In various embodiments, said possible codes include multiple different LDPC codes. In some such embodiments, said different LDPC codes correspond to different code graph structures. In some embodiments, said coding information includes interleaving information, said interleaving information indicating one of a plurality of different interleaving methods which may be used to interleave data prior to transmission using said coherent modulation. In some such embodiments, said coding information communicated on the pilot signals indicates the type of data transmitted using said coherent modulation, different types of data being coded using different coding methods according to a predetermined relationship between the type of data and the coding method used.

In some embodiments, said coding information indicates a combination of a convolutional code and an interleaving pattern. In some embodiments, individual codes are identical or complementary convolutional codes followed by different or random or pseudo-random interleaving.

Figure 18:
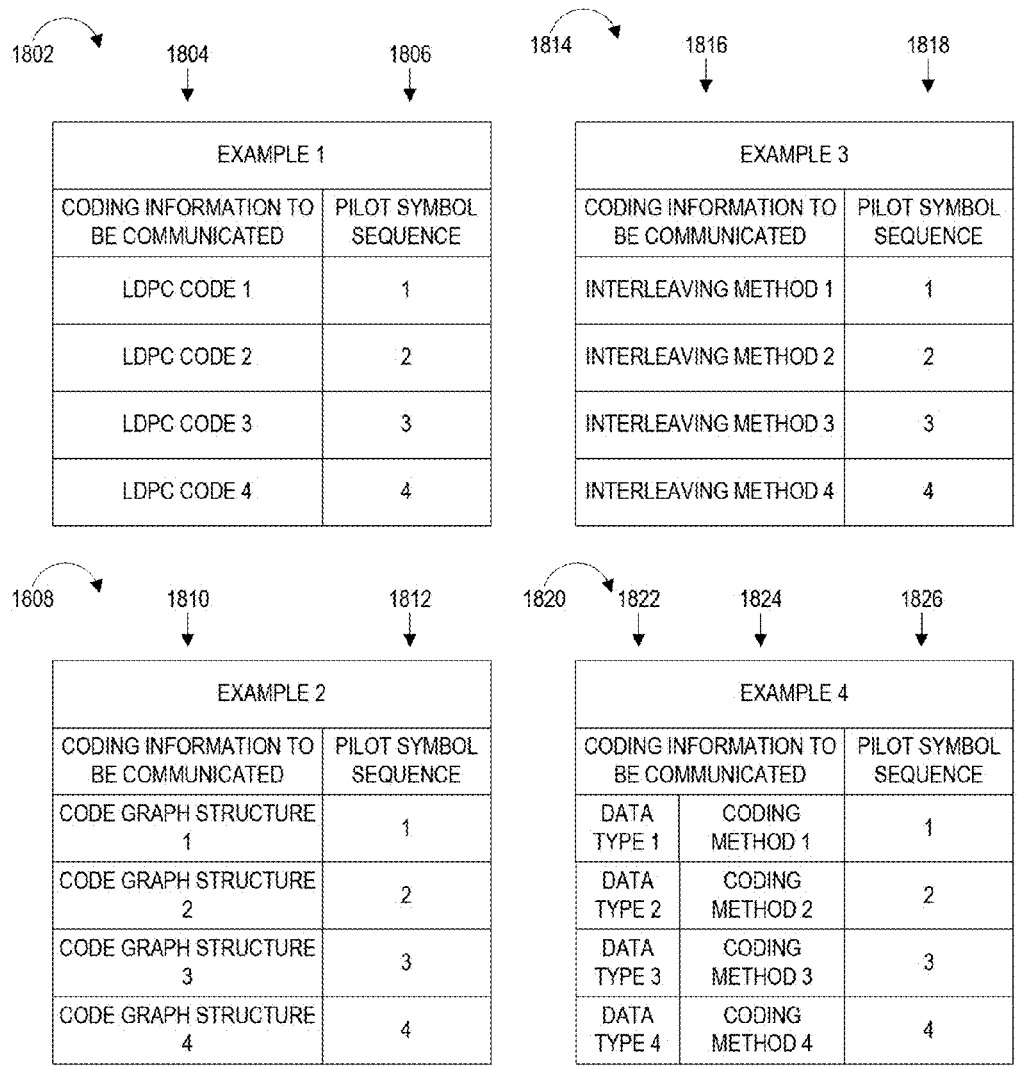
FIG. 18 illustrates four examples of exemplary coding information that may be communicated via pilot signals via non-coherent modulation.

FIG. 18 illustrates four examples of exemplary coding information that may be communicated via pilot signals and non-coherent modulation. The examples of FIG. 18 may be used by a device implementing a method in accordance with flowchart 1500 of FIG. 15 and/or flowchart 1900 of FIG. 19 and/or a device implemented in accordance with device 1600 of FIG. 16 and/or in accordance with assembly of modules 1700 of FIG. 17.

Table 1802 of FIG. 18 illustrates example 1 in which the coding information to be communicated is one of a plurality of different LDPC codes. First column 1804 indicates the coding information to be communicated and second column 1806 indicates the pilot symbol sequence. If it is to be communicated that LDPC code 1 is used to code the data transmitted using coherent modulation, then pilot symbol sequence 1 is used for the pilot signals. If it is to be communicated that LDPC code 2 is used to code the data transmitted using coherent modulation, then pilot symbol sequence 2 is used for the pilot signals. If it is to be communicated that LDPC code 3 is used to code the data transmitted using coherent modulation, then pilot symbol sequence 3 is used for the pilot signals. If it is to be communicated that LDPC code 4 is used to code the data transmitted using coherent modulation, then pilot symbol sequence 4 is used for the pilot signals. FIG. 10 illustrates an example of four different exemplary pilot sequences that are used in some embodiments, e.g., some embodiments, where there are 4 pilot symbols communicated in a pilot sequence.

Table 1808 of FIG. 18 illustrates example 2 in which the coding information to be communicated is one of a plurality of different code graph structures. First column 1810 indicates the coding information to be communicated and second column 1812 indicates the pilot symbol sequence. If it is to be communicated that code graph structure 1 is used to code the data transmitted using coherent modulation, then pilot symbol sequence 1 is used for the pilot signals. If it is to be communicated that code graph structure 2 is used to code the data transmitted using coherent modulation, then pilot symbol sequence 2 is used for the pilot signals. If it is to be communicated that code graph structure 3 is used to code the data transmitted using coherent modulation, then pilot symbol sequence 3 is used for the pilot signals. If it is to be communicated that code graph structure 4 is used to code the data transmitted using coherent modulation, then pilot symbol sequence 4 is used for the pilot signals.

Table 1814 of FIG. 18 illustrates example 3 in which the coding information to be communicated is one of a plurality of different interleaving methods. First column 1816 indicates the coding information to be communicated and second column 1818 indicates the pilot symbol sequence. If it is to be communicated that interleaving method 1 is used to code the data transmitted using coherent modulation, then pilot symbol sequence 1 is used for the pilot signals. If it is to be communicated that interleaving method 2 is used to code the data transmitted using coherent modulation, then pilot symbol sequence 2 is used for the pilot signals. If it is to be communicated that interleaving method 3 is used to code the data transmitted using coherent modulation, then pilot symbol sequence 3 is used for the pilot signals. If it is to be communicated that interleaving method 4 is used to code the data transmitted using coherent modulation, then pilot symbol sequence 4 is used for the pilot signals.

Table 1820 of FIG. 18 illustrates example 4 in which the coding information to be communicated is one of a plurality of different coding methods, each of the different coding methods associated with different data types. First column 1822 indicates the data type to be communicated; second column 1824 indicates the coding method to be communicated; and third column 1826 indicates the pilot symbol sequence. If it is to be communicated that coding method 1 is used to code data type 1 data which is transmitted using coherent modulation, then pilot symbol sequence 1 is used for the pilot signals. If it is to be communicated that coding method 2 is used to code data type 2 data which is transmitted using coherent modulation, then pilot symbol sequence 2 is used for the pilot signals. If it is to be communicated that coding method 3 is used to code data type 3 data transmitted using coherent modulation, then pilot symbol sequence 3 is used for the pilot signals. If it is to be communicated that coding method 4 is used to code data type 4 data which is transmitted using coherent modulation, then pilot symbol sequence 4 is used for the pilot signals.

Figure 19:
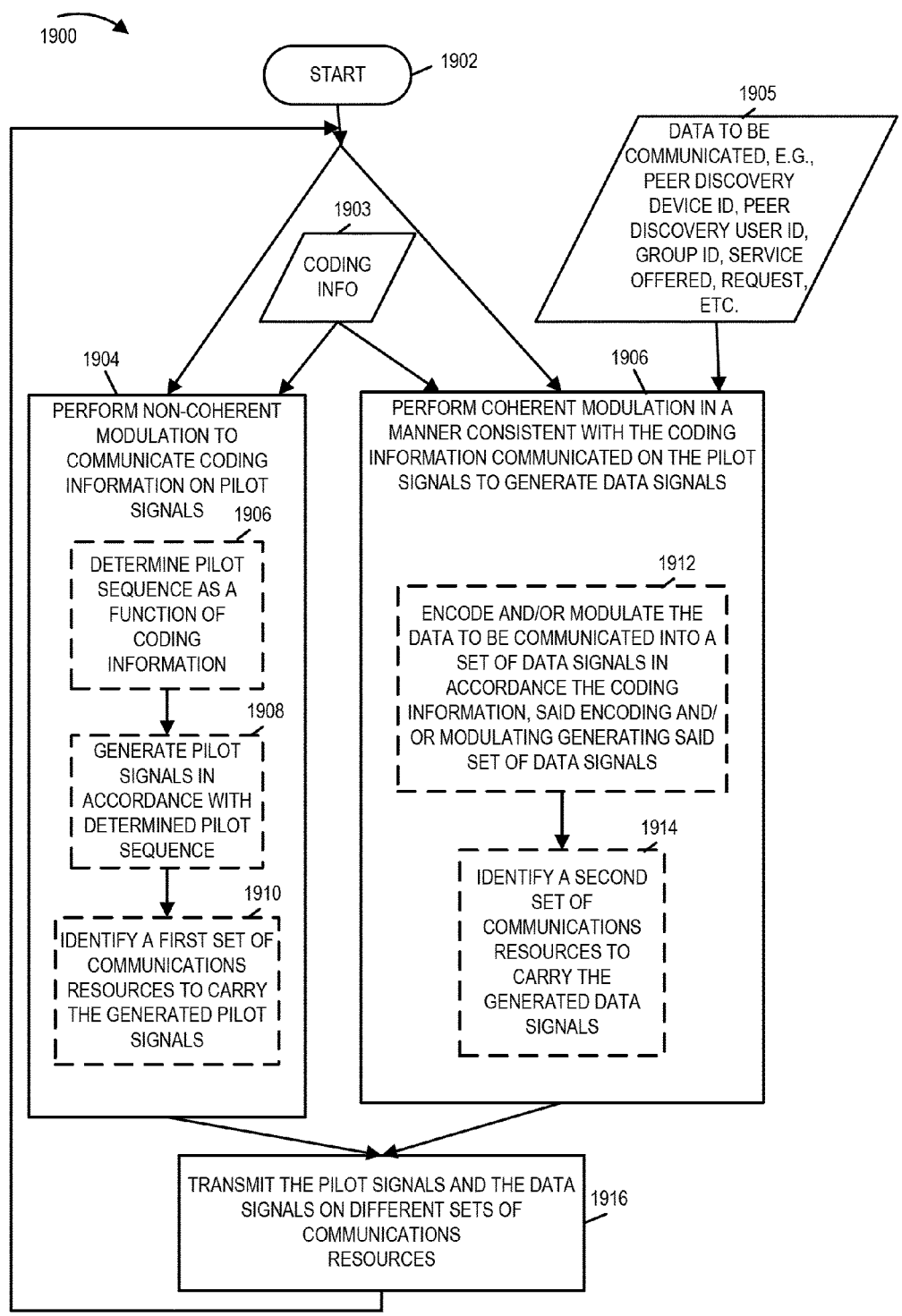
FIG. 19 is a flowchart 1900 of an exemplary method of operating a communications device to communicate information, e.g., to communicate peer discovery information, in accordance with an exemplary embodiment.

FIG. 19 is a flowchart 1900 of an exemplary method of operating a communications device to communicate information, e.g., communicate peer discovery information, in accordance with an exemplary embodiment. The communications device implementing the method of flowchart 1900 is, e.g., a wireless communications device which is part of a peer to peer network such as system 100 of FIG. 1. Operation starts in step 1902 where the communications device is powered on and initialized. Operation proceeds from start step 1902 to steps 1904 and 1906, which may be performed in parallel or serially.

In step 1904 the communications device performs non-coherent modulation to communicate coding information on pilot signals. Coding information 1903 is an input to step 1904. Coding information 1903 includes, e.g., one or more of LDPC code type, code graph structure identification information, interleaving method identification information, data type information, and coding method identification information.

In some embodiments, step 1904 includes one or more of sub-steps 1906, 1908 and 1910. In sub-step 1906 the communications device determines a pilot sequence as a function of the coding information 1903. Then in sub-step 1908 the communications device generates pilot signals in accordance with the determined pilot sequence. Operation proceeds from sub-step 1908 to sub-step 1910, in which the communications device identifies a first set of communications resources to carry the generated pilot signals.

Returning to step 1906, in step 1906 the communications device performs coherent modulation in a manner consistent with the coding information communicated on the pilot signals to generate data signals. Coding information 1903 and data to be communicated 1905 are inputs to step 1905. In some embodiments, the data to be communicated is peer discovery information, e.g., one or more of a device identifier, a user identifier, a group identifier, a service offered, a product offered, a service request, a product request, a search input, a proximity indicator, a status indicator, etc.

In some embodiments, step 1906 includes one or more of sub-steps 1912 and 1914. In sub-step 1912 the communications device encodes and/or modulates the data to be communicated 1905, into a set of data signals in accordance with the coding information 1903, said encoding and/or modulating generating said set of data signals. Operation proceeds from sub-step 1912 to sub-step 1914. In sub-step 1914 the communications device identifies a second set of communications resources to carry the generated data signals.

Operation proceeds from step 1904 and 1906 to step 1916. In step 1916 the communications device transmits the pilot symbols and data symbols on different sets of communications resources. In some embodiments, the coding information communicated on the pilot signals indicates one or a plurality of possible codes used to code data transmitted using said coherent modulation. In some embodiments, said plurality of possible codes correspond to different graphical structures. In some such embodiments, the possible codes include multiple different LDPC codes. In some such embodiments, the different LDPC codes correspond to different code graph structures. In various embodiments the coding information includes interleaving information, said interleaving information indicating one of a plurality of different interleaving methods which may be used to interleave data prior to transmission using said coherent modulation. In some embodiments, the coding information communicated on the pilot signals indicates the type of data transmitted using said coherent modulation, different types of data being coded using different coding methods according to a predetermined relationship between the type of data and the coding method used.

Some examples of different types of data include, e.g., control data, voice data, image data, and text data. Some other examples of different types of data include data classified by priority, data classified by service level, data classified by latency consideration, etc. Other examples of different types of data include data classified by application. Still another example of different types of data include different size block of data to be communicated prior to encoding. Different coding methods include, e.g., different coding rates, different constellations, different QAM levels, e.g., QAM 4 vs QAM 16, different levels of error correction, different codes of the same type, different types of codes, etc. Operation proceeds from step 1916 to the inputs of step 1904 and 1906, e.g., to process another set of coding information and data to be communicated.

Figure 20:
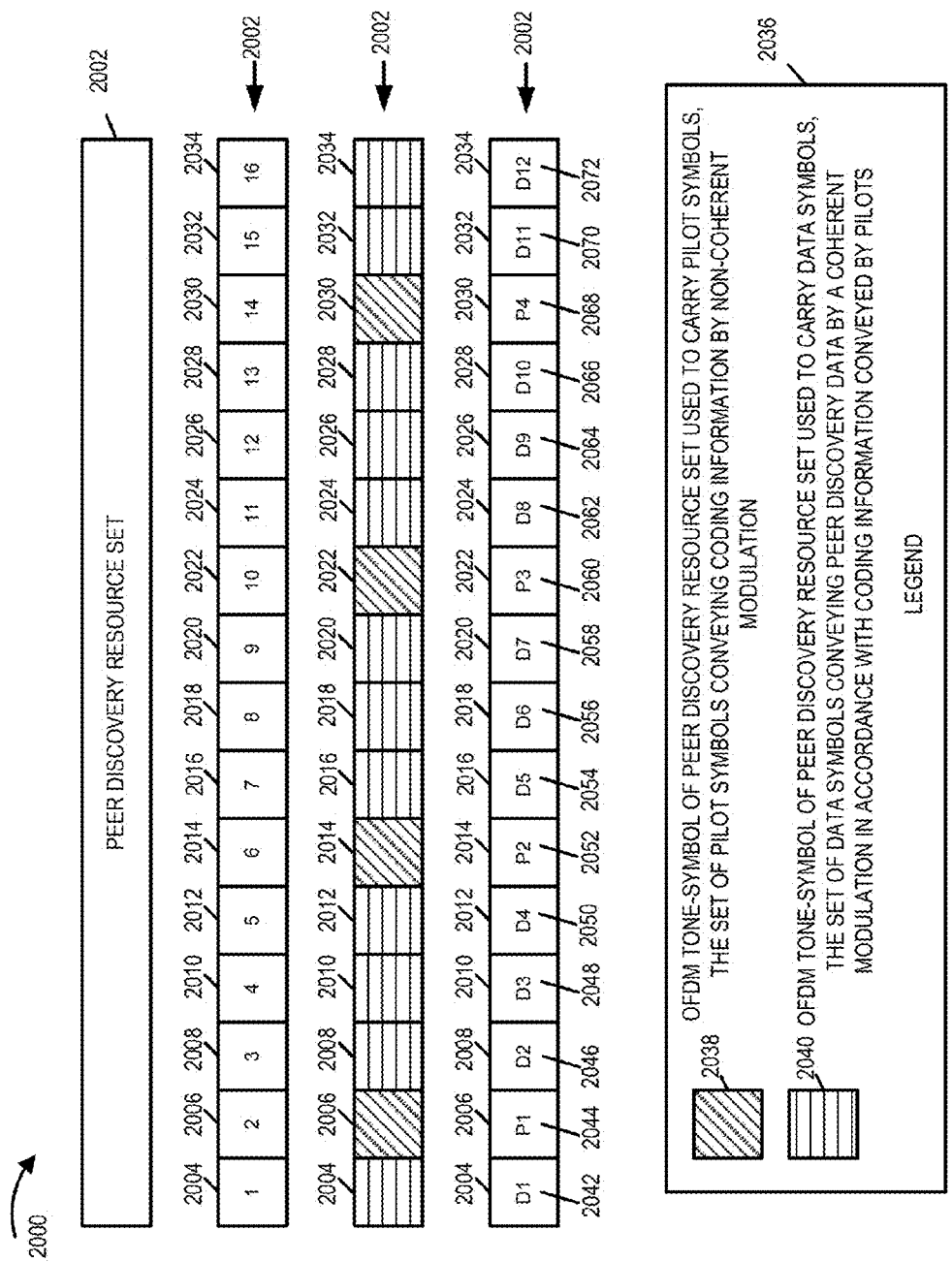
FIG. 20 is a drawing illustrating an exemplary peer discovery resource set used to carry pilot and data symbols.

FIG. 20 is a drawing 2000 illustrating an exemplary peer discovery resource set 2002 used to carry pilot and data symbols. Peer discovery resource set 2002 is, e.g., peer discovery resource set 804 of FIG. 8, where K=16 and $K_P$=4. Exemplary peer discovery resource set 2002 includes 16 indexed OFDM tone-symbols (tone-symbol 1 2004, tone symbol 2 2006, tone-symbol 3 2008, tone-symbol 4 2010, tone-symbol 5 2012, tone-symbol 6 2014, tone-symbol 7 2016, tone-symbol 8 2018, tone-symbol 9 2020, tone-symbol 10 2022, tone-symbol 11 2024, tone-symbol 12 2026, tone-symbol 13 2028, tone-symbol 14 2030, tone-symbol 15 2032 and tone-symbol 16 2034).

Diagonal line shading as indicated by box 2038 of legend 2036 indicates that an OFDM tone-symbol of the peer discovery resource set is used to carry a pilot symbol, the set of pilot symbols conveying coding information by non-coherent modulation. Horizontal line shading as indicated by box 2040 of legend 2036 indicates that an OFDM tone-symbol of the peer discovery resource set is used to carry a data symbol, the set of data symbols conveying peer discovery data by a coherent modulation scheme in accordance with the coding information conveyed by the pilots. In this example a first subset of tone-symbols (2006, 2014, 2022 and 2030) are designated to be used to carry pilot symbols, while a second non-overlapping subset of tone-symbols (2004, 2008, 2010, 2012, 2016, 2018, 2020, 2024, 2026, 2028, 2032, 2034) are used to carry the data symbols. In the example of FIG. 20, tone-symbols (2006, 2014, 2022 and 2030) carry pilot symbols (P1 2044, P2 2052, P3 2060 and P4 2068), respectively. In the example of FIG. 20, tone-symbols (2004, 2008, 2010, 2012, 2016, 2018, 2020, 2024, 2026, 2028, 2032, 2034) carry data symbols (D1 2042, D2 2046, D3 2048, D4 2050, D5 2054, D6 2056, D7 2058, D8 2062, D9 2064, D10 2066, D11 2070, D12 2072), respectively.

Consider one example, in which the coding information to be communicated is one of a plurality of different LDPC codes, e.g., as one or the codes of example 1 of table 1802 of FIG. 18. Further consider that the pilot symbol sequences are represented by FIG. 10. Also consider that the resources to be used to carry the pilot signals and data signals are a set of peer discovery communications resources, e.g., peer discovery resource set 2002. Further consider that the data to be communicated is a device identifier corresponding to a group, e.g., $ID_{G1}$.

Consider that the coding information indicates LDPC code 3 is to be used. Table 1802 indicates that LDPC code 3 maps to pilot sequence 3. Pilot sequence 3 is defined as P1=+, P2=−, P3=+, P4=−, so the communications device generates those pilot symbols for communication over OFDM tone-symbols (2006, 2014, 2022, 2030) respectively. In addition the communications device uses LDPC code 3 to process the input data to be communicated, e.g., the device identifier corresponding to a group ($ID_{G1}$), to generate a set of QAM modulation symbols (D1, D2, D3, D4, D5, D5, D7, D8, D9, D10, D11, D12) which will communicate the data by coherent modulation. The communications device transmits the pilot signals, e.g., pilot symbols, and data signals, e.g., data symbols, on different sets of communications resources within the peer discovery resource set 2002.

Figure 21:
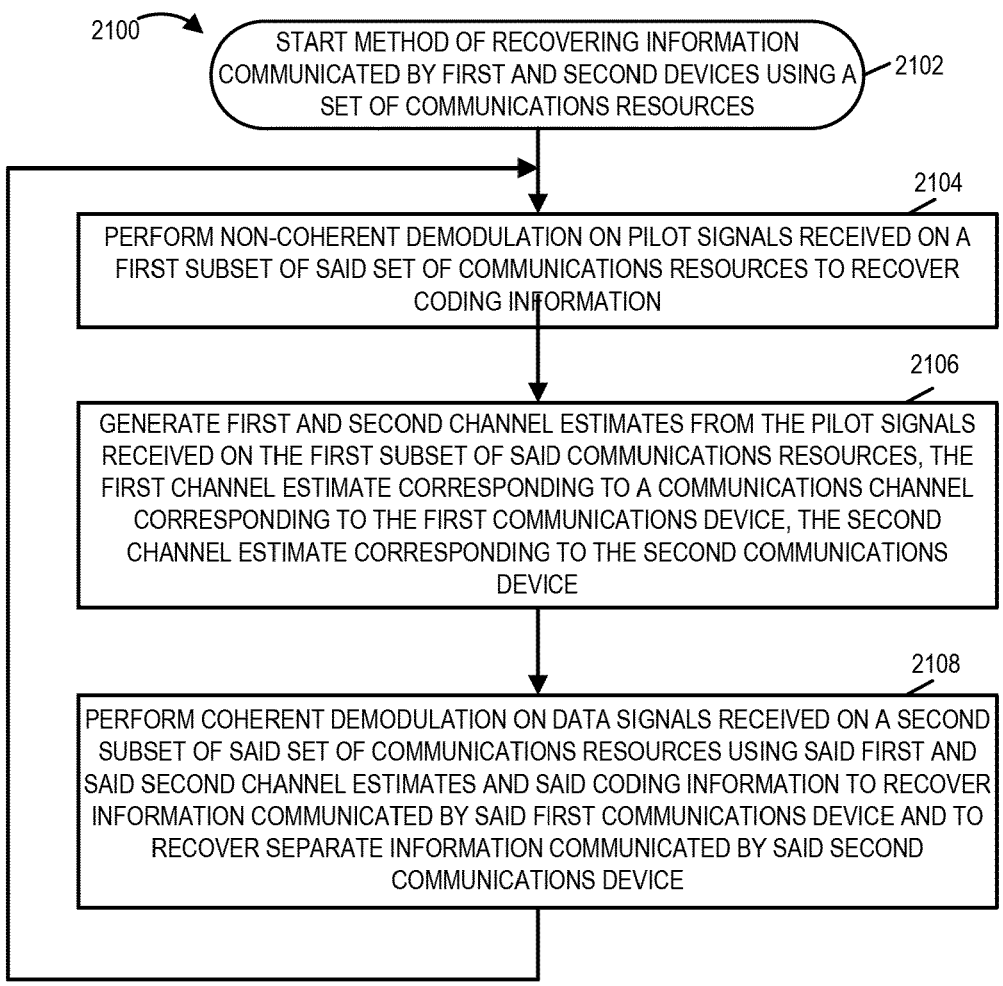
FIG. 21 is a flowchart of an exemplary method of operating a communications device to recover information communicated by first and second devices using a set of communications resources.

FIG. 21 is a flowchart 2100 of an exemplary method of operating a communications device, e.g., a wireless terminal, to recover information communicated by first and second communications devices using a set of communications resources. In some embodiments the set of communications resources are peer identification resources in an ad hoc network which supports peer to peer communications. In one example, the communications device implementing the method of flowchart 2100, the first communications device and the second communications device are any of the peer to peer communications devices of system 100 of FIG. 1. Operation starts in step 2102, where the communications device is powered on and initialized and proceeds to step 2104.

In step 2104 the communications device performs non-coherent demodulation on pilot signals received on a first subset of said set of communications resources to recover coding information. In some embodiments the recovered coding information includes information indicating a first code used to encode data transmitted by said first communications device and information indicating a second code used to encode data transmitted by said second communications device. In some such embodiments, the first and second codes are different. In some embodiments, the first and second codes correspond to different graphical structures. In some such embodiments, the first and second codes are different LDPC codes which use different LDPC code graphs.

In some embodiments, the recovered coding information includes information indicating a first interleaving operation which was performed by the first communications device on data to be transmitted prior to transmission and information indicating a second interleaving operation which was performed by the second communications device on data to be transmitted by the second communications device prior to transmission. In some such embodiments, the first and second interleaving operations perform different reordering operations.

In some embodiments, the recovered coding information includes information indicating a first code to be used to encode data to be transmitted by the first communications device and information indicating a second code used to encode data transmitted by the second communications device and also indicates different interleaving operations performed by said first and second communications devices prior to transmission of data by said first and second communications devices, respectively.

In some embodiments, the non-coherent demodulation also provides information indicating whether a peer identifier communicated by at least one of said first and second communications devices using coherent modulation is a public identifier or a private identifier. Operation proceeds from step 2104 to step 2106.

In step 2106 the communications device generates first and second channel estimates from the pilot signals received on the first subset of said communications resources, the first channel estimate corresponding to a communications channel corresponding to the first communications device, the second channel estimate corresponding to the second communications device. Operation proceeds from step 2106 to step 2108.

In step 2108 the communications device performs coherent demodulation on data signals received on a second subset of said set of communications resources using said first and said second channel estimates and said coding information communicated by said first communications device and to recover separate information communicated by said second communications device. In various embodiments, the first subset is smaller than the second subset, and the first and second subsets are non-overlapping. In some embodiments, signals received from both the first and second communications devices are received on at least some of the same resources in the first subset of resources and at least some of the same resources in the second subset of resource. In some embodiments, the information recovered using coherent demodulation includes peer identifiers. In some embodiments the information recovered from a device using coherent demodulation conveys at least one of a peer device identifier, a peer user identifier, a group identifier, a service offered, a service requested, an item offered, an item requested, proximity information, and status information. In some embodiments, information recovered from the first and second device may be, and sometimes are, different types of information, e.g., different types of peer discovery information. Operation proceeds from step 2108 to step 2104, e.g., where the communications device starts to process another set of received signals including pilots signals and data signals.

Figure 22:
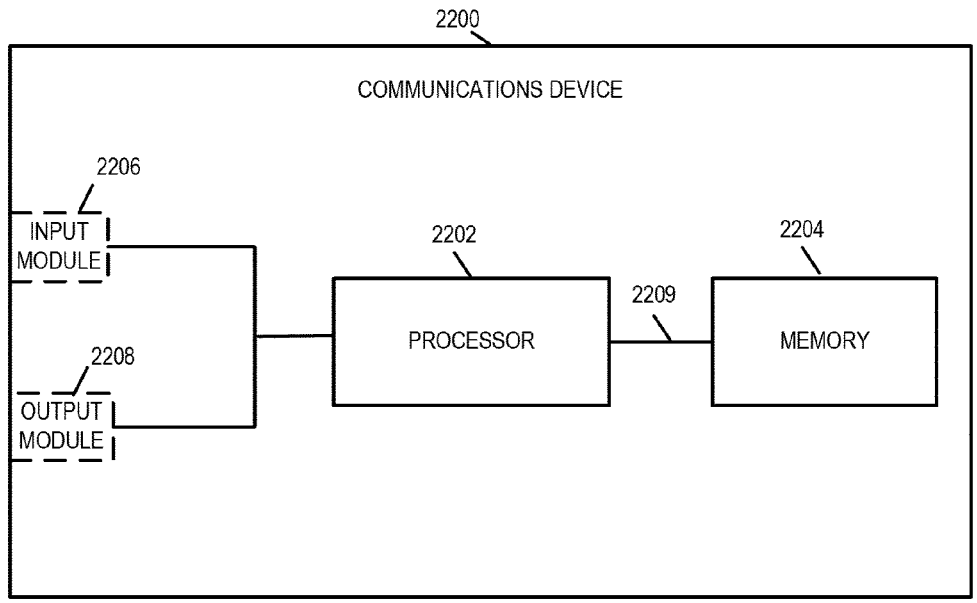
FIG. 22 is a drawing of an exemplary communications device, in accordance with an exemplary embodiment.

FIG. 22 is a drawing of an exemplary communications device 2200, e.g., a wireless terminal, in accordance with an exemplary embodiment. Exemplary communications device 2200 is, e.g., one of the wireless communications devices of FIG. 1. Exemplary communications device 2200 may, and sometimes does, implement a method in accordance with flowchart 2100 of FIG. 21.

Communications device 2200 includes a processor 2202 and memory 2204 coupled together via a bus 2209 over which the various elements (2202, 2204) may interchange data and information. Communications device 2200 further includes an input module 2206 and an output module 2208 which may be coupled to processor 2202 as shown. However, in some embodiments, the input module 2206 and output module 2208 are located internal to the processor 2202. Input module 2206 can receive input signals. Input module 2206 can, and in some embodiments does, include a wireless receiver and/or a wired or optical input interface for receiving input. Output module 2208 may include, and in some embodiments does include, a wireless transmitter and/or a wired or optical output interface for transmitting output.

Processor 2202 is configured to: perform non-coherent demodulation on pilot signals received on a first subset of said set of communications resources to recover coding information; and generate first and second channel estimates from the pilot signals received on the first subset of said communications resources, the first channel estimate corresponding to a communications channel corresponding to a first communications device, the second channel estimate corresponding to a second communications device. Processor 2202 is further configured to perform coherent demodulation on data signals received on a second subset of said set of communications resources using said first and second channel estimates and said coding information to recover information communicated by said first communications device and to recover separate information communicated by said second communications device. In some embodiments, said recovered coding information includes information indicating a first code used to encode data transmitted by said first communications device and information indicating a second code used to encode data transmitted by said second communications device. In some embodiments, the first and second codes are different. In some embodiments, the first and second codes correspond to different graphical structures. In some such embodiments, the first and second codes are different LDPC codes which use different LDPC code graphs.

In some embodiments, said recovered coding information includes information indicating a first interleaving operation which was performed by the first communications device on data to be transmitted prior to transmission and information indicating a second interleaving operation which was performed by the second communications device on data to be transmitted by the second communications device prior to transmission. In some such embodiments, said first and second interleaving operations perform different data reordering operations.

In various embodiments, said recovered coding information includes information indicating a first code used to encode data transmitted by said first communications device and information indicating a second code used to encode data transmitted by said second communications device and also indicates different interleaving operations performed by said first and second communications devices prior to transmission of data by said first and second communications devices, respectively.

In some embodiments, the first subset is smaller than said second subset, said first and second subsets being non-overlapping. In some such embodiments, signals from both the first and second communications devices are received on at least some of the same resources in the first subset of resources and at least some of the same resources in the second subset of resources.

In some embodiments, the set of communications resources are peer identification resources in an ad hoc network which supports peer to peer communications. In some such embodiments, the information recovered using coherent demodulation includes peer identifiers.

In some embodiments, said non-coherent demodulation also provides information indicating whether said peer identifier communicated by at least one of said first and second communications device using coherent modulation is a public identifier or a private identifier.

Figure 23:
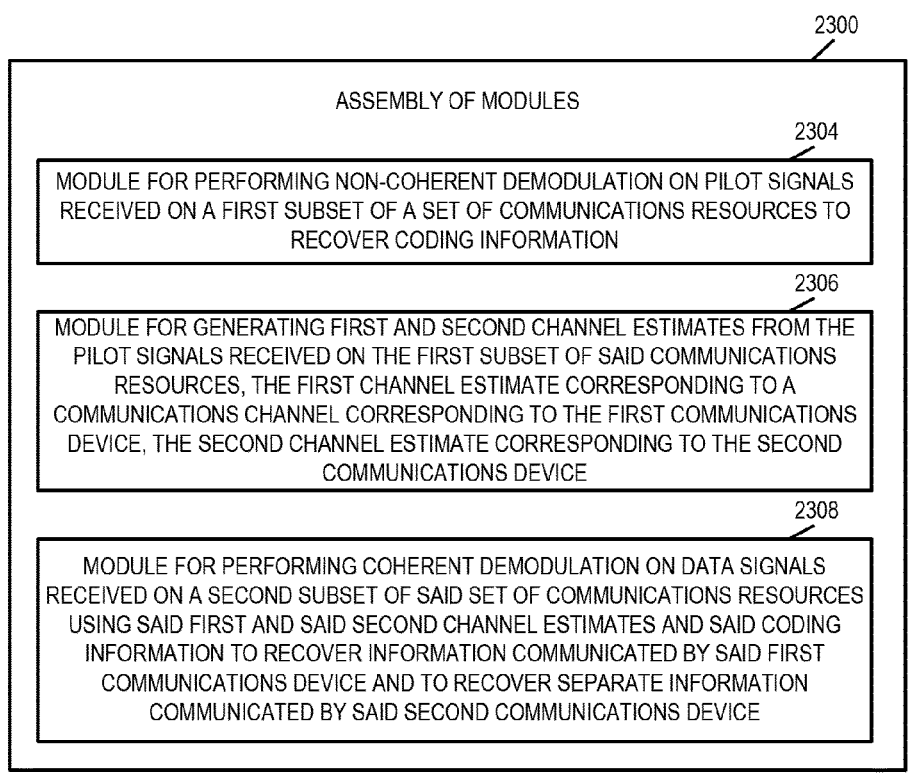
FIG. 23 is an assembly of modules which can, and in some embodiments is, used in the communications device illustrated in FIG. 22.

FIG. 23 is an assembly of modules 2300 which can, and in some embodiments is, used in the communications device 2200, e.g., wireless terminal, illustrated in FIG. 22. The modules in the assembly 2300 can be implemented in hardware within the processor 2202 of FIG. 22, e.g., as individual circuits. Alternatively, the modules may be implemented in software and stored in the memory 2204 of the communications device 2200 shown in FIG. 22. While shown in the FIG. 22 embodiment as a single processor, e.g., computer, it should be appreciated that the processor 2202 may be implemented as one or more processors, e.g., computers. When implemented in software the modules include code, which when executed by the processor, configure the processor, e.g., computer, 2202 to implement the function corresponding to the module. In some embodiments, processor 2202 is configured to implement each of the modules of the assembly of modules 2300. In embodiments where the assembly of modules 2300 is stored in the memory 2204, the memory 2204 is a computer program product comprising a computer readable medium comprising code, e.g., individual code for each module, for causing at least one computer, e.g., processor 2202, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 2200 or elements therein such as the processor 2202, to perform the functions of the corresponding steps illustrated in the method flowchart 2100 of FIG. 21.

Assembly of module 2300 includes a module 2304 for performing non-coherent demodulation on pilot signals received on a first subset of a set of communications resources to recover coding information and a module 2306 for generating first and second channel estimates from the pilot signals received on said first subset of said communications resources, the first channel estimate corresponding to communications channel corresponding to a first communications device, the second channel estimate corresponding to a second communications device. Assembly of modules 2300 further includes a module 2308 for performing coherent demodulation on data signals received on a second subset of said set of communications resources using said first and said second channel estimates and said coding information to recover information communicated by said first communications device and to recover separate information communicated by said second communications device.

In some embodiments, said recovered coding information includes information indicating a first code used to encode data transmitted by said first communications device and information indicating a second code used to encode data transmitted by said second communications device. In some embodiments, the first and second codes are different. In some embodiments, the first and second codes correspond to different graphical structures. In some such embodiments, the first and second codes are different LDPC codes which use different LDPC code graphs.

In some embodiments, said recovered coding information includes information indicating a first interleaving operation which was performed by the first communications device on data to be transmitted prior to transmission and information indicating a second interleaving operation which was be performed by the second communications device on data to be transmitted by the second communications device prior to transmission. In some such embodiments, said first and second interleaving operations perform different data reordering operations.

In various embodiments, said recovered coding information includes information indicating a first code used to encode data transmitted by said first communications device and information indicating a second code used to encode data transmitted by said second communications device and also indicates different interleaving operations performed by said first and second communications devices prior to transmission of data by said first and second communications devices, respectively.

In some embodiments, the first subset is smaller than said second subset, said first and second subsets being non-overlapping. In some such embodiments, signals from both the first and second communications devices are received on at least some of the same resources in the first subset of resources and at least some of the same resources in the second subset of resources.

In some embodiments, the set of communications resources are peer identification resources in an ad hoc network which supports peer to peer communications. In some such embodiments, the information recovered using coherent demodulation includes peer identifiers.

In some embodiments, said non-coherent demodulation also provides information indicating whether said peer identifier communicated by at least one of said first and second communications device using coherent modulation is a public identifier or a private identifier.

Figure 24:
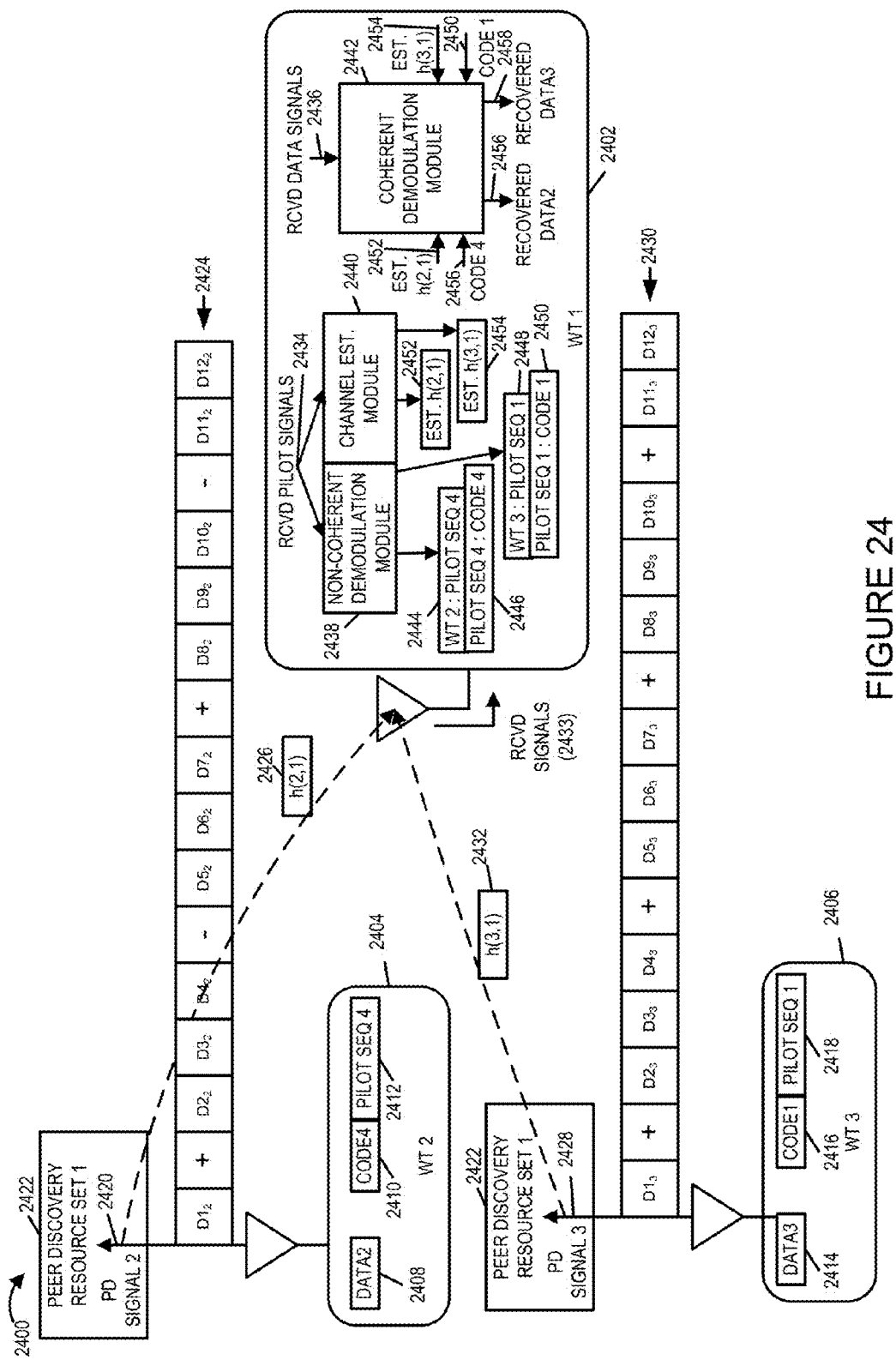
FIG. 24 is a drawing illustrating an example in which a wireless communications device, e.g., a wireless terminal, recovers information communicated by two other wireless communications devices using a set of communications resources in accordance with an exemplary embodiment.

FIG. 24 is a drawing 2400 illustrating an example in which a wireless communications device, e.g., a wireless terminal, recovers information communicated by two other wireless communications devices using a set of communications resources in accordance with an exemplary embodiment. Drawing 2400 includes exemplary communications devices (wireless terminal 1 2402, wireless terminal 2 2404, wireless terminal 3 2406). The wireless terminals (2402, 2404, 2406) are, e.g., any of the exemplary devices of system 100 of FIG. 1. Wireless terminal 1 2402 is, e.g., a wireless terminal implementing a method in accordance with flowchart 2100 of FIG. 21. Wireless terminal 2 2404 and wireless terminal 3 2406 are, e.g., wireless terminals implementing a method in accordance with flowchart 1500 of FIG. 15 and/or flowchart 1900 of FIG. 19. Wireless terminal 1 2402 includes a non-coherent demodulation module 2438, a channel estimation module 2440 and a coherent demodulation module 2442. Modules (2438, 2440, 2442) are, in some embodiments, modules (2304, 2306, 2308) of assembly of modules 2300 of FIG. 23.

Wireless terminal 2 2404 has data 2 2408 that it would like to communicate over a peer discovery resource set. WT 2 2404 is currently using peer discovery resource set 1 2422. Wireless terminal 2 2404 is using code 4 2410 to code and/or modulate data 2 2408 into a set of data modulation symbols. Coherent modulation will be used to communicate the data symbols. Code 4 2410 maps to pilot sequence 4 2412, e.g., in accordance with a predetermined mapping known to WTs (2402, 2404, 2406). Code 4 2410 will be communicated via non-coherent modulation using pilot sequence 4 2412 from among a predetermined set of different alternative pilot sequences. Wireless terminal 2 2404 generates and transmits peer discovery signal 2 2420 over peer discovery air link resource set 2422. Drawing 2424 represents the composite of the peer discovery signal 2 2420 and air link resource set 1 2422. Peer discovery signal 2 2420 includes 12 data modulation symbols ($D1_2, D2_2, D3_2, D4_2, D5_2, D6_2, D7_2, D8_2, D9_2, D10_2, D11_2, D12_2$) and pilot sequence 4 (+−+−) mapped to the 16 ordered OFDM tone-symbols as shown in 2424. Peer discovery signal 2 2420 is communicated from wireless terminal 2 2404 to wireless terminal 1 2402 using peer discovery air link resource set 1 2422, and the channel between WT 2 2404 and WT 1 2402 is represented by h(2,1) 2426.

Wireless terminal 3 2406 has data 3 2414 that it would like to communicate over a peer discovery resource set. WT 3 2406 is currently using peer discovery resource set 1 2422. Note that peer discovery resource set 1 2422 is being used concurrently by both WT 2 2404 and WT 3 2406. Wireless terminal 3 2406 is using code 1 2416 to code and/or modulate data 3 2414 into a set of data modulation symbols. Coherent modulation will be used to communicate the data symbols. Code 1 2416 maps to pilot sequence 1 2418, e.g., in accordance with a predetermined mapping known to WTs (2402, 2404, 2406). Code 1 2416 will be communicated via non-coherent modulation using pilot sequence 1 2418 from among a predetermined set of different alternative pilot sequences. Wireless terminal 3 2406 generates and transmits peer discovery signal 3 2428 over peer discovery air link resource set 2422. Drawing 2430 represents the composite of the peer discovery signal 3 2428 and air link resource set 1 2422. Peer discovery signal 3 2428 includes 12 data modulation symbols ($D1_3, D2_3, D3_3, D4_3, D5_3, D6_3, D7_3, D8_3, D9_3, D10_3, D11_3, D12_3$) and pilot sequence 1 (++++) mapped to the 16 ordered OFDM tone-symbols as shown in 2430. Peer discovery signal 3 2428 is communicated from wireless terminal 3 2406 to wireless terminal 1 2402 using peer discovery air link resource set 1 2422, and the channel between WT 3 2406 and WT 1 2402 is represented by h(3,1) 2432.

Wireless terminal 1 2402 receives signals 2433 corresponding to air link resource set 2422. Signals 2433 represents a composite of transmitted signals (2420 and 2420), subject to communications channels (h(2,1)2426, h(3,1) 2432), respectively. Received signals 2433 includes received pilots signals 2434 and received data signals 2436. Received pilot signals 2433 corresponds to the received signals over the air link resources carrying the pilot symbols, e.g., the four pilot OFDM tone-symbols in peer discovery resource set 1 2422. Received data signals 2436 corresponds to the received signals over the air link resources carrying the data modulation symbols, e.g., the twelve data OFDM tone-symbols, in peer discovery resource set 1 2422.

Non-coherent demodulation module 2438 processes the received pilot signals 2434 and identifies that pilot sequence 4 has been detected as indicated by box 2444. WT 1 2402 further identifies, e.g., from stored information associating different pilot sequences with different coding information, that code 4 was used for coding and/or modulating the data communicated on the data symbols from the same device that transmitted pilot symbol sequence 4, as indicated by box 2446. Non-coherent demodulation module 2438, in processing the received pilot signals 2434 also identifies that pilot sequence 1 has been detected as indicated by box 2448. WT 1 2402 further identifies, e.g., from stored information associating different pilot sequences with different coding information, that code 1 was used for coding and/or modulating the data communicated on the data symbols from the same device that transmitted pilot symbol sequence 1, as indicated by box 2450.

Channel estimation module 2440 uses the received pilot signals 2434 to estimate two channels. Corresponding to pilot sequence 4, channel estimation module 2440 generates estimated h(2,1) 2452. Corresponding to pilot sequence 1, channel estimation module 2440 generates estimated h(3,1) 2454.

Coherent demodulation module 2442 performs coherent demodulation on the received data signals 2436, using the estimated channels (estimated (h2,1) 2452, estimated (h3,1) 2454) and the identified codes (code 4 2456, code 1 2458), to recover information communicated by the second device (recovered data 2 2456) and information communicated by the third device (recovered data 3 2458). Consider that the recovery is successful; recovered data 2 2456 matches data 2 2408, and recovered data 3 2458 matches data 3 2414.

Various aspects and features of some embodiments will be described. Some aspects are related to methods and apparatus for choosing and maintaining pilot phase in a peer to peer network. In some embodiments a pilot phase is embedded in a small codeword, which typically spans the pilot positions of the peer discovery signals. This codeword is decoded non-coherently by any receiver to retrieve the pilot phase, which will be further used to decode the peer discovery codeword. Various aspects are directed to simple methods for a peer to peer device to choose a pilot phase.

In some embodiments each pilot phase corresponds to a different (non-coherent) codeword. There are two simple codebooks which can be, and sometimes are, used for this purpose, one is Walsh sequence and the other is Fourier sequence. Various exemplary methods are not necessarily binded to a particular choice of the codebook. Other codebooks may be, and sometimes are, used in various exemplary embodiments. However, for simplicity of explanation, these two exemplary codebooks, Walsh sequence and Fourier sequence types, are used in exemplary presented examples.

Examples will now be described with regard to one exemplary peer to peer network. After a device joins the network, the device will first try to find a resource, named as PDRID (peer discovery resource ID) to broadcast its identity. Various methods may be used for picking the ID. One simple approach is to pick the PDRID with the least detected energy on it. After that, the device also has to pick the pilot phase. There are possibly multiple other peers using the same PDRID. The device will decode the (possibly multiple) pilot phases being used by said other peers and pick one from the rest available pilot phases. In an example where Walsh sequences are being used for pilot phase codewords, the device, in some embodiments, carries out FHT (fast hadamard transform) to get an estimate of energy on each of the possible pilot phases. In general, the device will try to non-coherently decode the pilot phases in use and measure their energy.

After obtaining the energy associated with each pilot phase, the device can make a decision on which pilot phase it will use. One possibility is to pick the one with the smallest energy on it. However, in some scenarios, for example, when Walsh sequence type of codewords are being used, the protection is not the same between different pairs of codewords. For example, (1 1 1 1 1 1 1 1) is more likely to be confused to be (1 1 1 1 -1 -1 -1 -1) rather than (1 -1 1 -1 1 -1 1 -1). In this case, a device, in some embodiments, will pick some codewords with higher priorities than others, if all of them are available.

After successfully obtaining the pilot phase, in some embodiments, a device will keep silent in his resource, during at least some times, to monitor the current pilot phase usage. In the example of Walsh sequence, a device does FHT when it keeps silent and makes a decision if it has to change its pilot phase choice and/or its PDRID.

Various aspects related to methods for hierarchical signaling in a peer to peer wireless network will be described. In wireless networks, it is often desirable to organize coded information in a hierarchical manner. A simple example is when the set of available symbols (or physical resources) is divided into (i) the support of a small code (or of a pilot sequence) and (ii) the support set of a larger code (carrying the data). As we will see, this layered coding is of particular interest when one aims at decoding/detecting several peers interfering on the same physical link. Various aspects include encapsulating some information characterizing the transmitted coherent (typically large) codebook (ii) into a non-coherent pilot (typically small) codebook located in (i). At the receiving device (RX), the non-coherent code is used for channel estimation as well as for obtaining information characterizing the coherent code. This hierarchical decoding is particularly efficient to deal with several interferers, e.g., in combination with joint iterative decoding of the coherent code. It could also be, and in some embodiments is, used in the non-interference case to characterize which coding/decoding is being used (e.g., decoding in peer discovery performed via matching or Viterbi).

A first example will now be described. In peer to peer and wireless networks, a key feature, in some embodiments, is the ability of detecting and decoding several peers interfering on a same physical resource. First, several strategies can be devised at a system level in order to efficiently use the available but limited air interface resources. Second, to complement the first approach, it is desirable that each receiving device (RX) detects and decodes jointly different peers on a same link. This is a multi-user interference channel where, in practice, the state of the various physical links is unknown. The RX has to non-coherently decode several interferers; a task that is quite complex in general. It is therefore advantageous, in accordance with some embodiments, to split this complex non-coherent coding task into two simple tasks: (i) non-coherent coding for a fraction of the symbols; (ii) standard coherent coding for the remaining symbols. In other words, coding is performed in a hierarchical manner (where typically two stages are considered). The (typically small and low rate) non-coherent code is, in some embodiments, supported by a set of symbols that can be viewed as "pilots," hence the name of "pilot code." The second (typically larger) code will be referred to as coherent code.

A first consequence of this hierarchical coding scheme is that the RX, in some embodiments, uses this non-coherent pilot code to jointly estimate the channels formed by the interfering links A second consequence, in some embodiments, is that, because each TX uses a particular non-coherent pilot codeword, the RX will get some information relative to each of the TX codebooks, which it can further use to decode the second (typically large) coherent code. The hierarchical coding is particularly well-adapted to the problem of joint decoding in a wireless network where each node broadcasts synchronously certain information. An important feature of some embodiments is that the non-coherent pilot code, in some embodiments, communicates information on the particular coherent codebook used by the TX. This idea is particularly suitable for the case of multi-user detection because it reduces the original non-coherent multi-user decoding problem into a similar problem but using much shorter (pilot) codes. Codebook characteristics that can be encoded in the pilot codes are, e.g., connectivity for sparse graph codes, constraint length or polynomials for convolutional codes, bit/symbol permutation etc.

A second example will now be described. An example, where hierarchical coding is of interest, are some peer to peer networks including a timing structure including peer discovery. In some peer to peer networks, during a peer discovery phase, each device broadcasts its particular ID. This ID can be of different kinds Consider an example where there are two types: public or private. Public IDs are encoded via a convolutional code. Private IDs do not need to be encoded because compatible private IDs form a small set of random sequences, which by default is already a good low rate code. A possibility is to encode the type of ID via a non-coherent pilot code. Then, the TX will first perform non-coherent decoding, then, depending on the type, will perform either convolutional code decoding (via Viterbi or other algorithms) in the case of public ID or much faster sequence matching in the case of private ID. In addition, unequal error protection (e.g., for the format bits) can be addressed.

Methods and apparatus for orthogonalizing pilot sequences in a wireless network with many broadcasting nodes will be described. In some peer to peer and wireless networks, a key feature is the ability of detecting and decoding several peers interfering on a same physical resource. At the link level, this translates into the non-coherent joint decoding of two or more peers. In some embodiment, first, a subset of the time slots is reserved for a non-coherent pilot code; second, the complementary set is associated with a coherent code. The coherent code is typically a larger code than the non-coherent pilot code. At the RX, the non-coherent code is decoded in a first phase, during which the channel is also jointly estimated, and information is obtained that may facilitate or improve the decoding of the second coherent code. Consider the case where several peers interfere in the same physical resource. One can consider the non-coherent code, whose positions form a typically small subset of the available time slots, as a set of possible pilot sequences that interfere with each other. Various embodiments are related to a design of pilot codes, i.e., a set of pilot sequences, that perform efficiently in scenarios of interest.

An example including peer discovery as part of an exemplary peer to peer network will now be described. Interfering signals arrive on a single tone. Consider a case of a static channel model:

$$y_y = h_1 x_t^{[1]} + h_2 x_t^{[2]} + v_t$$
$$h_i = \sqrt{E_i}\, e^{j\theta_i},$$
$$\theta_i \in u(0, 2\pi)$$
$$x_t^{[i]} \in \mathcal{A}_{QPSK}$$

or $$\mathcal{P} v_t \in C\mathcal{N}(0, \sigma^2)$$

Then, consider that 8 pilot positions are reserved for the pilot code, we can use 8 orthogonal Wash sequences to form the pilot code. In the two-interferer case, the probability of collision is 1/8 and this simple scheme performs very well in combination with joint iterative decoding.

Another example including peer discovery as part of an exemplary peer to peer network will now be described. Interfering signals arrive on a single tone. Consider the case of a time-varying channel model where each signal experiences a different frequency offset. For example, a typically moderate offset, i.e., in a range of 400 Hz for peer discovery in one exemplary system may be used.

New Channel Model: $y_t = h_t^{[1]} x_t^{[1]} + h_t^{[2]} x_t^{[2]} + v_t$
where $h_t^{[i]} = \sqrt{E_i} e^{j\theta_i} e^{j2\pi f_i t}$, $f_i \in \mathcal{U}(\ldots 200, 200)$ Then, consider that 12 pilot positions are reserved for the pilot code, we can use 8 specific "orthogonal" sequences to form the pilot code. We will describe potential sets of such sequences in the sequel. Notice first that they will play the rule of the Walsh sequence in the previous example but now for a particular time-varying channel, which is a very good first order approximation of the channel for peer discovery in an exemplary system.

The main task of the non-coherent channel decoder is to separate the two different frequency offsets f1 and f2. Therefore, it is beneficial if the "orthogonal" pilot sequences to use have some notion of "orthogonality" in the frequency domain. In some embodiments, well-adapted Fourier-like sequences are used given by the row of the matrix F. For peer discovery in one exemplary peer to peer system:

$$F = \sqrt{E_s} \begin{bmatrix} e^{j2\pi \Delta f_1 T_p \cdot 0} & e^{j2\pi \Delta f_1 T_p \cdot 1} & \ldots & e^{j2\pi \Delta f_1 T_p \cdot 11} \\ e^{j2\pi \Delta f_2 T_p \cdot 0} & e^{j2\pi \Delta f_2 T_p \cdot 1} & \ldots & e^{j2\pi \Delta f_2 T_p \cdot 11} \\ \vdots & \vdots & \ddots & \vdots \\ e^{j2\pi \Delta f_8 T_p \cdot 0} & e^{j2\pi \Delta f_8 T_p \cdot 1} & \ldots & e^{j2\pi \Delta f_8 T_p \cdot 11} \end{bmatrix} \in C^{8 \times 12},$$

$$\Delta f_k = \frac{2k-1}{16 T_p}$$

A suitable choice of 8 Fourier-like sequences and 12 pilot positions faciliatates the performance sequence detection and channel estimation of multi-interferers using Cadzow iterative denoising (CD) method and Prony's method (or annihilating filter method, AF). This method, which seeks to detect 2 spikes in the frequency domain, turns out to be very efficient in our case. In various embodiments, we are looking at the frequency domain for spikes. Alternatively to CD+AF, in some embodiments, more classical FFT-based decoding/estimation methods are used. Notice also that orthogonalization can be, and sometimes is, implemented by introducing artificial phase rotation to both data symbols and pilot symbols, which is of practical interest in our case.

Various methods and apparatus related to joint iterative decoding with side codebook, e.g., interleaver information via, e.g., Pilot Code, will now be described. In some peer to peer and wireless networks, a key feature is the ability of detecting and decoding several peers interfering on a same physical resource. Various strategies can be devised and used at a system level in order to efficiently use the available but limited air interface resource. For practical implementations of the physical layer, link level techniques are traditionally based on successive interference cancelation. Today, modern coding theory provides a new framework for deriving efficient receivers that are inherently iterative, hence low complexity, and still quasi-optimal in the limit of large lengths.

Various embodiments implement a method that takes advantage of probabilistic coding methods by randomizing further the underlying graphical structure of the overall graph code. This approach is well suited to implementations where joint iterative decoding of two or more interferers is considered. This code design approach is therefore particularly efficient in conjunction with hierarchical coding design used in some embodiments. In some embodiments, the graph code used by a particular peer as defined belongs to a very small subset of possible graphs; its index is potentially encoded by the non-coherent code. In some embodiments, peers use different codes in order to improve the joint (coherent) iterative decoding of the two (and, as a side effect, potentially, the coding itself). Various embodiments implement a practical code design for a coherent multi-user interference channel.

An example and application for one exemplary peer to peer communications system will now be described. Consider the transmitter device (TX). The TX chooses, e.g., at random or pseudo-randomly or following certain rules, a codebook in a list of possible codes. This can be, e.g., a given sparse graph code or, in the particular case of peer discovery in one exemplary peer to peer communication system, this can be an interleaver picked in a common set of possible interleavers. Then, the TX performs the following two tasks. The TX encodes the codebook index using a non-coherent code, which is further placed on a set of pilot positions. This forms a "pilot" code aimed at being non-coherently decoded. The TX also encodes the information bits using its particular codebook choice. For peer discovery in one exemplary peer to peer system, each of the devices will share the same convolutional code. Each device will then permute the encoded bits via its own interleaver choice. From a pure coding viewpoint, different codebooks might bring better performance, especially if when short block lengths are considered, even in cases where it is not a priori required from an information theory perspective. Thus, in some embodiments different codebooks are used. Hence the described method can, and sometimes is, also be used with other decoders than joint iterative decoders.

Consider the receiver device (RX). First, the RX decodes the non-coherent code in order to jointly decode the codebook index, e.g., the interleaver index for peer discovery in the peer to peer system, and estimate the channel. Second, the RX builds the graphical structure associated with coherent decoding of the two interferers in order to perform joint iterative decoding. Notice that this second decoding based on a loopy factor graph is suboptimal in general. However, for the strict viewpoint of probabilistic decoding, the irregularity and randomness (introduced by the fact that, with a certain probability, the codebooks of two interferers are different) will, in many cases, improve the overall decoding performance. The RX, in some embodiments, possesses several receiving antennas to improve the decoding performance.

An exemplary application to wireless networks will now be described. A particularly good example is the peer discovery phase of one exemplary peer to peer communications system. In one embodiment, peer discovery uses small codewords, e.g., 60 complex symbols, obtained from a convolutional encoder, in combination with 12 pilot symbols. Now, assume, e.g., that each TX picks uniformly at random one particular pilot codeword among 8 potential complex-valued codewords of length 12. Each of the 8 codewords encodes 3 bits that labels a particular interleaver. Once a pilot codeword is chosen, the TX interleaves the complex outputs of the coherent (convolutional based) code accordingly. Various embodiments are well suited for use with convolutional codes and different interleavers. In particular short convolutional codes work well in this approach since the overall global code that they form when associated with interleaving is very strong. This is independent of the type of decoding used to recover the information being communicated. At the RX, several, e.g., two, peers interfere on a particular peer discovery resource ID (PDRID) resource. In a first stage, in some embodiments, the RX will jointly estimate the channel and decode the non-coherent pilot sequences. With probability 7/8, it will be able to separate the two pilot sequences of largest strength and further assign to each of them a particular label. Hence it knows which particular interleaver is associated with each of the two interfering peers. In a second stage, the RX will perform joint iterative decoding of these two (or more) peers. The graphical model will be similar (slightly more complex) to the one of a turbo code (e.g., two BCJR decoders exchanging information that is permuted according to the decoded interleaver indices). If the two peers use a different interleaver (with probability 7/8), then the associated joint factor graph has larger loops and, hence, is believed to be more efficient. The joint coding scheme itself (independently of the decoder) is more efficient in some practical scenarios.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device to communicate information, the method comprising:
   monitoring a plurality of different sets of communications resources;
   determining the amount of energy received on at least a first portion of said different sets of communications resources;
   based on the determined amount of energy, selecting a set of communications resources from said plurality of different sets of communications resources to use for communication;
   making a pseudo random selection of one of a plurality of different pilot sequences to use for said communication, said selecting one of a plurality of different pilot sequences being for a first time period;
   transmitting pilot signals using the selected one of the plurality of different pilot sequences and at least a second portion of the selected set of communications resources; and
   changing to a different one of the plurality of different pilot sequences and using the different one of the plurality of pilot sequences during a second time period which is subsequent to said first time period according to a predetermined function.

2. The method of claim 1, wherein said different pilot sequences in said plurality of different pilot sequences are orthogonal.

3. The method of claim 1, wherein said different pilot sequences in said plurality of different pilot sequences include pilots which differ in phase but not amplitude.

4. The method of claim 1, further comprising:
   determining the amount of energy attributable to signals corresponding to different ones of said plurality of different pilot sequences; and
   wherein said step of selecting one of the plurality of different pilot sequences includes basing the selection on the determined amount of energy attributable to the different individual ones of the plurality of pilot sequences.

5. The method of claim 4, wherein said selecting includes selecting the pilot sequence which has the lowest amount of energy attributed to it.

6. The method of claim 1, wherein said different sets of communications resources are sets of peer discovery resources which recur in a predetermined timing structure used to control timing in a communications network in which said wireless communications device is located.

7. The method of claim 1, wherein each set of communication resources is a set of contiguous OFDM tone-symbols corresponding to a single tone for a predetermined number of symbol transmission time periods.

8. A method of operating a communications device to communicate information, the method comprising:
   monitoring a plurality of different sets of communications resources;
   determining the amount of energy received on at least a first portion of said different sets of communications resources;
   based on the determined amount of energy, selecting a set of communications resources from said plurality of different sets of communications resources to use for communication;
   selecting one of a plurality of different pilot sequences to use for said communication;
   transmitting pilot signals using the selected one of the plurality of different pilot sequences and at least a second portion of the selected set of communications resources,
   said transmitting pilot signals including introducing a first uniform phase rotation from one pilot signal to the next to produce a Fourier sequence; and introducing a second uniform phase rotation which is a function of the first uniform phase rotation into data symbols to be transmitted using a third portion of the selected set of communications resources, said third portion not including said second portion.

9. A communications device comprising:
means for monitoring a plurality of different sets of communications resources;
means for determining the amount of energy received on at least a first portion of said different sets of communications resources;
means for selecting, based on the determined amount of energy, a set of communications resources from said plurality of different sets of communications resources to use for communication;
means for making a pseudo random selection of one of a plurality of different pilot sequences to use for said communication, said means for selecting one of a plurality of different pilot sequences selecting a first pilot sequence for a first time period;
means for transmitting pilot signals using the selected one of the plurality of different pilot sequences and at least a second portion of the selected set of communications resources; and
means for changing to a different one of the plurality of different pilot sequences and using the different one of the plurality of pilot sequences during a second time period which is subsequent to said first time period according to a predetermined function.

10. The communications device of claim 9, wherein said different pilot sequences in said plurality of different pilot sequences are orthogonal.

11. The communications device of claim 9, wherein said different pilot sequences in said plurality of different pilot sequences include pilots which differ in phase but not amplitude.

12. A communications device comprising:
means for monitoring a plurality of different sets of communications resources;
means for determining the amount of energy received on at least a first portion of said different sets of communications resources;
means for selecting, based on the determined amount of energy, a set of communications resources from said plurality of different sets of communications resources to use for communication;
means for selecting one of a plurality of different pilot sequences to use for said communication;
means for transmitting pilot signals using the selected one of the plurality of different pilot sequences and at least a second portion of the selected set of communications resources, said means for transmitting pilot signals including means for introducing a first uniform phase rotation from one pilot signal to the next to produce a Fourier sequence; and
means for introducing a second uniform phase rotation which is a function of the first uniform phase rotation into data symbols to be transmitted using a third portion of the selected set of communications resources, said third portion not including said second portion.

13. A computer program product for use in a communications device, the computer program product comprising:
a non-transitory computer readable medium comprising:
code for causing at least one computer to monitor a plurality of different sets of communications resources;
code for causing said at least one computer to determine the amount of energy received on at least a first portion of said different sets of communications resources;
code for causing said at least one computer to select, based on the determined amount of energy, a set of communications resources from said plurality of different sets of communications resources to use for communication;
code for causing said at least one computer to make a pseudo random selection of one of a plurality of different pilot sequences to use for said communication, said code for causing said at least one computer to select one of a plurality of different pilot sequences including code for causing said at least one computer to select a first pilot sequence for a first time period;
code for causing said at least one computer to transmit pilot signals using the selected one of the plurality of different pilot sequences and at least a second portion of the selected set of communications resources; and
code for causing said at least one computer to change to a different one of the plurality of different pilot sequences and using the different one of the plurality of pilot sequences during a second time period which is subsequent to said first time period according to a predetermined function.

14. A communications device comprising: at least one processor configured to:
monitor a plurality of different sets of communications resources;
determine the amount of energy received on at least a first portion of said different sets of communications resources;
select, based on the determined amount of energy, a set of communications resources from said plurality of different sets of communications resources to use for communication;
make a pseudo random selection of one of a plurality of different pilot sequences to use for said communication, said at least one processor being configured to select a first pilot sequence for a first time period as part of being configured to select one of a plurality of different pilot sequences;
transmit pilot signals using the selected one of the plurality of different pilot sequences and at least a second portion of the selected set of communications resources; and
change to a different one of the plurality of different pilot sequences and using the different one of the plurality of pilot sequences during a second time period which is subsequent to said first time period according to a predetermined function; and
memory coupled to said at least one processor.

15. The communications device of claim 14, wherein said different pilot sequences in said plurality of different pilot sequences are orthogonal.

16. A computer program product for use in a communications device, the computer program product comprising:
a non-transitory computer readable medium comprising:
code for causing at least one computer to monitor a plurality of different sets of communications resources;
code for causing said at least one computer to determine the amount of energy received on at least a first portion of said different sets of communications resources;
code for causing said at least one computer to select, based on the determined amount of energy, a set of communications resources from said plurality of different sets of communications resources to use for communication;

code for causing said at least one computer to select one of a plurality of different pilot sequences to use for said communication;

code for causing said at least one computer to transmit pilot signals using the selected one of the plurality of different pilot sequences and at least a second portion of the selected set of communications resources, said code for causing said at least one computer to transmit pilot signals including code for causing said at least one computer to introduce a first uniform phase rotation from one pilot signal to the next to produce a Fourier sequence; and code for causing said at least one computer to introduce a second uniform phase rotation which is a function of the first uniform phase rotation into data symbols to be transmitted using a third portion of the selected set of communications resources, said third portion not including said second portion.

17. A communications device comprising: at least one processor configured to:

monitor a plurality of different sets of communications resources;

determine the amount of energy received on at least a first portion of said different sets of communications resources;

select, based on the determined amount of energy, a set of communications resources from said plurality of different sets of communications resources to use for communication;

select one of a plurality of different pilot sequences to use for said communication;

transmit pilot signals using the selected one of the plurality of different pilot sequences and at least a second portion of the selected set of communications resources, said at least one processor being configured to introduce, as part of transmitting pilot signals, a first uniform phase rotation from one pilot signal to the next to produce a Fourier sequence; and introduce a second uniform phase rotation which is a function of the first uniform phase rotation into data symbols to be transmitted using a third portion of the selected set of communications resources, said third portion not including said second portion; and memory coupled to said at least one processor.

* * * * *